US012676108B2

(12) United States Patent
Lee et al.

(10) Patent No.: US 12,676,108 B2
(45) Date of Patent: Jul. 7, 2026

(54) DISPLAY DEVICE HAVING A PIXEL AND A LIGHT SENSOR

(71) Applicant: Samsung Display Co., LTD., Yongin-si (KR)

(72) Inventors: Yu Jin Lee, Yongin-si (KR); Hee Jean Park, Yongin-si (KR); Hee Rim Song, Yongin-si (KR); Cheol Gon Lee, Yongin-si (KR); Mu Kyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/158,936

(22) Filed: Jan. 24, 2023

(65) Prior Publication Data

US 2023/0343290 A1 Oct. 26, 2023

(30) Foreign Application Priority Data

Apr. 25, 2022 (KR) ........................ 10-2022-0050850

(51) Int. Cl.
*G09G 3/3233* (2016.01)
*G06V 40/13* (2022.01)

(52) U.S. Cl.
CPC ....... *G09G 3/3233* (2013.01); *G06V 40/1318* (2022.01); *G09G 2300/0413* (2013.01);
(Continued)

(58) Field of Classification Search
CPC ................................................... G09G 3/3233
(Continued)

(56) References Cited

U.S. PATENT DOCUMENTS 11,158,258 B2    10/2021    Cha et al.
11,281,328 B2    3/2022     Yoo et al.
(Continued)

FOREIGN PATENT DOCUMENTS

KR    10-2017-0037344 A    4/2017
KR    10-2018-0051692 A    5/2018
(Continued)

OTHER PUBLICATIONS

Office action issued Nov. 27, 2025 by the Ministry of Intellectual Property (Republic of Korea) for corresponding Korean Patent Application No. 10-2022-0050850, 8 pages.

*Primary Examiner* — Long D Pham
(74) *Attorney, Agent, or Firm* — Womble Bond Dickinson (US) LLP

(57) ABSTRACT

A display device includes a light-emitting element for emitting light, a light-sensing element for converting light into an electrical signal, and spaced apart from the light-emitting element, pixel drivers connected to the light-emitting element in a first row and a second row, a first sensing driver between respective ones of the pixel drivers neighboring each other in the first row and connected to the light-sensing element, a second sensing driver between respective ones of the pixel drivers neighboring each other in the second row, connected to the light-sensing element, and not neighboring the first sensing driver in a second direction, a first scan line extending along a first direction crossing the second direction, and connected to the first sensing driver, and a second scan line extending along the first direction, alternately arranged with the first scan line along the second direction, and connected to the second sensing driver.

15 Claims, 22 Drawing Sheets

(52) U.S. Cl.
CPC ............... *G09G 2300/0426* (2013.01); *G09G 2300/0465* (2013.01); *G09G 2300/0819* (2013.01); *G09G 2300/0842* (2013.01); *G09G 2300/0861* (2013.01); *G09G 2310/0202* (2013.01); *G09G 2310/0264* (2013.01); *G09G 2320/0223* (2013.01); *G09G 2360/14* (2013.01)

(58) Field of Classification Search
USPC .......................................................... 345/204
See application file for complete search history.

(56) References Cited

U.S. PATENT DOCUMENTS

| | | | | |
|---|---|---|---|---|
| 11,727,874 | B2 | 8/2023 | Cha et al. | |
| 12,148,380 | B2 | 11/2024 | Cha et al. | |
| 2007/0057190 | A1* | 3/2007 | Hatanaka | H04N 25/671 |
| | | | | 348/E3.021 |
| 2011/0096027 | A1* | 4/2011 | Jeon | G09G 3/3677 |
| | | | | 327/109 |
| 2012/0206049 | A1* | 8/2012 | Han | H10K 59/13 |
| | | | | 313/504 |
| 2014/0061739 | A1* | 3/2014 | Kurokawa | G06F 3/0412 |
| | | | | 257/292 |
| 2018/0120614 | A1* | 5/2018 | Shin | H10K 59/60 |
| 2019/0122626 | A1* | 4/2019 | Du | G09G 3/20 |
| 2021/0019035 | A1* | 1/2021 | Yoo | G06F 3/04166 |
| 2021/0158751 | A1* | 5/2021 | Cha | H10K 65/00 |
| 2021/0202602 | A1* | 7/2021 | Yuan | G09G 3/3258 |
| 2022/0285460 | A1* | 9/2022 | Kim | G06F 3/0421 |
| 2025/0069549 | A1 | 2/2025 | Cha et al. | |

FOREIGN PATENT DOCUMENTS

| | | | |
|---|---|---|---|
| KR | 20210009894 | A | 1/2021 |
| KR | 20210064483 | A | 6/2021 |

* cited by examiner

20: 21, 22, 23, 24, 25

DR3

PDU: PDI1, PDU2, PDU3, PDU4

RPDU1: PDU1, PDU2, PDU3, PDU4
RPDU2: PDU1, PDU2, PDU3, PDU4

RPDU1: PDU1, PDU2, PDU3, PDU4
RPDU2: PDU1, PDU2, PDU3, PDU4

ACT1: D1, A1, S1, DTS, DTA, DTD
GTL1: G1, DTG, CE11
GTL2: BML1, CE12
GTL3: GCLk
DTL1: BE3, VIL2, BE1, BE2
DTL2: DLj, VDL

ACT1: D5, A5, S5
GTL1: G5
GTL2: BML1, BML2
ACT2: D2, A2, S2, D3, A3, S3
GTL3: G2, G3
DTL1: BE5, BE2, BE1
DTL2: ANDE1

RPDU1: PDU1, PDU2, PDU3, PDU4
RPDU2: PDU1, PDU2, PDU3, PDU4

DR3

GTL1: FE1
GTL2: BML1
GTL3: GCLk
DTL1: FE2
DTL2: FE4

DISPLAY DEVICE HAVING A PIXEL AND A LIGHT SENSOR

CROSS-REFERENCE TO RELATED APPLICATION

This application claims priority to, and the benefit of, Korean Patent Application No. 10-2022-0050850 filed on Apr. 25, 2022, in the Korean Intellectual Property Office (KIPO), the entire content of which is incorporated by reference herein.

BACKGROUND

1. Field

One or more embodiments of the present disclosure relate to a display device.

2. Description of the Related Art

Display devices are applied to various electronic devices, such as smartphones, tablets, notebook computers, monitors, and televisions. Recently, the development of mobile communication technology has greatly increased the use of portable electronic devices, such as smartphones, tablets, and notebook computers. A portable electronic device stores privacy information. Therefore, fingerprint authentication is used to authenticate a fingerprint, which is a user's biometric information, to protect the privacy information of the portable electronic device.

For example, a display device may authenticate a user's fingerprint using an optical method, an ultrasonic method, a capacitive method, or the like. The optical method may authenticate a user's fingerprint by sensing light reflected from the user's fingerprint. To authenticate a user's fingerprint using the optical method, the display device may include a display panel including pixels for displaying an image and photo sensors for sensing light.

SUMMARY

Aspects and features of embodiments of the present disclosure provide a display device capable of improving resolution compared with the area of a pixel by reducing or minimizing the area of a sensing driver of a photo sensor.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to one or more embodiments of the present disclosure, there is provided a display device including a light-emitting element for emitting light, a light-sensing element for converting light into an electrical signal, and spaced apart from the light-emitting element, pixel drivers connected to the light-emitting element in a first row and a second row, a first sensing driver between respective ones of the pixel drivers neighboring each other in the first row and connected to the light-sensing element, a second sensing driver between respective ones of the pixel drivers neighboring each other in the second row, connected to the light-sensing element, and not neighboring the first sensing driver in a second direction, a first scan line extending along a first direction crossing the second direction, and connected to the first sensing driver, and a second scan line extending along the first direction, alternately arranged with the first scan line along the second direction, and connected to the second sensing driver.

The first sensing driver may be staggered with the second sensing driver along the second direction.

The first sensing driver may be repeatedly arranged at intervals along the first row in the first direction, wherein the second sensing driver is repeatedly arranged at intervals along the second row in the first direction.

Each of the pixel drivers may be connected to the first scan line or the second scan line.

At least four of the pixel drivers may be sequentially arranged along the first direction.

At least eight of the pixel drivers may be between the first sensing driver and another first sensing driver neighboring each other in the first direction.

The display device may further include a first column readout line connected to the second sensing driver, and extending in the second direction, and a second column readout line connected to the first sensing driver, extending in the second direction, and alternately arranged with the first column readout line along the first direction.

The first sensing driver may include a first sensing transistor for controlling a sensing current that flows to the second column readout line according to a voltage of a gate electrode, and a second sensing transistor connected to the second column readout line and to the first sensing transistor by the first scan line.

The display device may further include a first dummy circuit unit alternately arranged with the first sensing driver along the first direction, and a second dummy circuit unit alternately arranged with the second sensing driver along the first direction, and alternately arranged with the first sensing driver along the second direction.

Each of the first sensing driver and the second sensing driver may include a first sensing transistor for controlling a sensing current that flows to a readout line according to a voltage of a gate electrode, wherein each of the first dummy circuit unit and the second dummy circuit unit includes a first dummy electrode at a same layer as the gate electrode of the first sensing transistor.

The first dummy electrode may be electrically floating.

According to one or more embodiments of the present disclosure, there may be provided a display device including first row pixel drivers in first rows, second row pixel drivers in second rows, first sensing drivers and first areas alternately arranged in a first direction in the first rows, and second sensing drivers and second areas in the second rows, the second areas being alternately arranged with the first sensing drivers in a second direction crossing the first direction.

The second sensing drivers and the second areas may be alternately arranged in the first direction, wherein the second sensing drivers and the first areas are alternately arranged in the second direction.

The first sensing drivers and the first areas may respectively overlap first row scan lines extending in the first direction, wherein the second sensing drivers and the second areas respectively overlap second row scan lines that extend in the first direction, and that are alternately arranged with the first row scan lines in the second direction.

At least one first row pixel driver among the first row pixel drivers may be between one of the first sensing drivers and one of the first areas neighboring each other in the first direction, wherein at least one second row pixel driver among the second row pixel drivers is between one of the second sensing drivers and one of the second areas neighboring each other in the first direction.

According to one or more embodiments of the present disclosure, there is provided a display device including light-emitting portions for emitting light, pixel drivers for supplying a driving current to each of the light-emitting portions, light-sensing portions for sensing incident light, and spaced apart from the light-emitting portions, and a first sensing driver between neighboring ones of the pixel drivers neighboring each other in a first direction, and electrically connected to the light-sensing portions.

The first sensing driver may be for supplying a sensing current to any one readout line among readout lines according to photocurrents of the light-sensing portions.

The display device may further include first sensing electrode connected to the first sensing driver for each group of the light-sensing portions, and including a connection portion connecting the light-sensing portions.

The connection portion may overlap at least two pixel drivers among the pixel drivers, and may be between the light-emitting portions.

The display device may further include a second sensing driver between neighboring ones of the pixel drivers neighboring each other in the first direction, electrically connected to light-sensing portions, and not neighboring the first sensing driver in a second direction crossing the first direction, and a second sensing electrode connected to the second sensing driver for each group of the light-sensing portions.

According to the aforementioned and other embodiments of the present disclosure, the number of pixels per unit area may be increased by reducing or minimizing the area of a sensing driver of a photo sensor. Accordingly, the resolution of the display device can be improved.

BRIEF DESCRIPTION OF THE DRAWINGS

The above and other embodiments and features of the present disclosure will become more apparent by describing embodiments thereof with reference to the attached drawings, in which.

4

Figure 8:
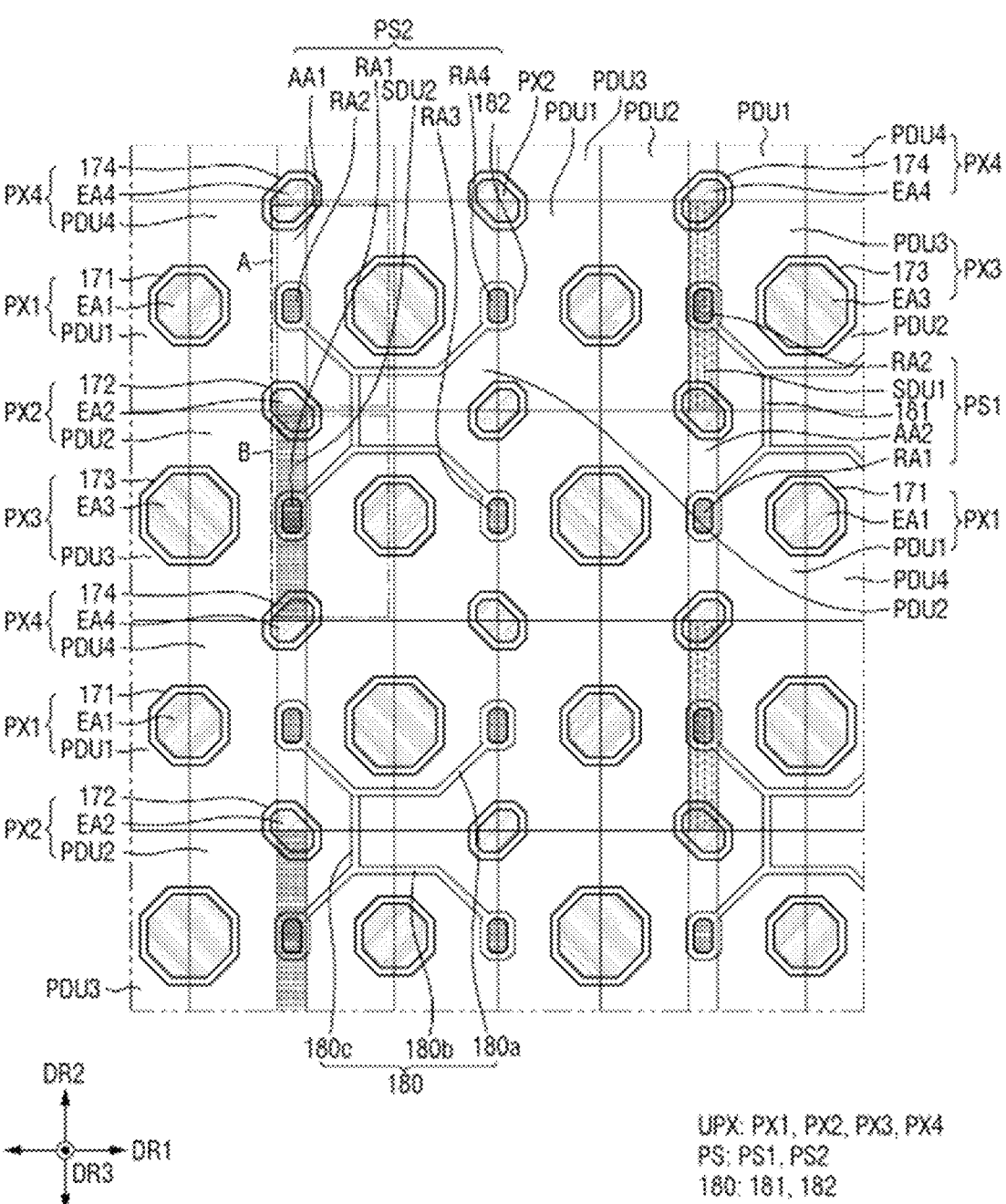
FIG. 8 is a layout view illustrating pixels and photo sensors in a display area of a display panel according to FIG. 7.
Figure 10:
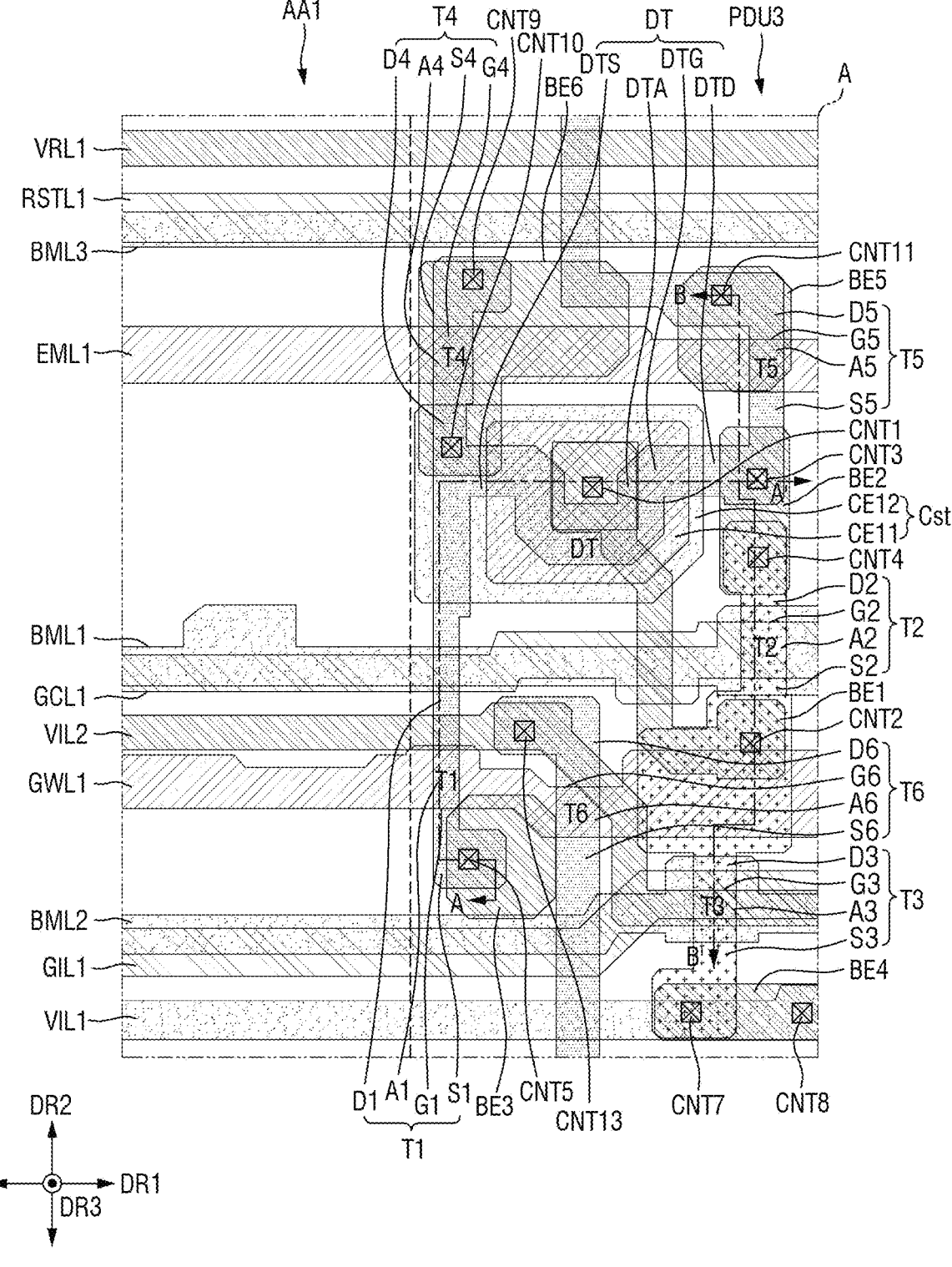
FIGS. 10 and 11 are detailed layout views of area A of FIG. 8.
Figure 11:
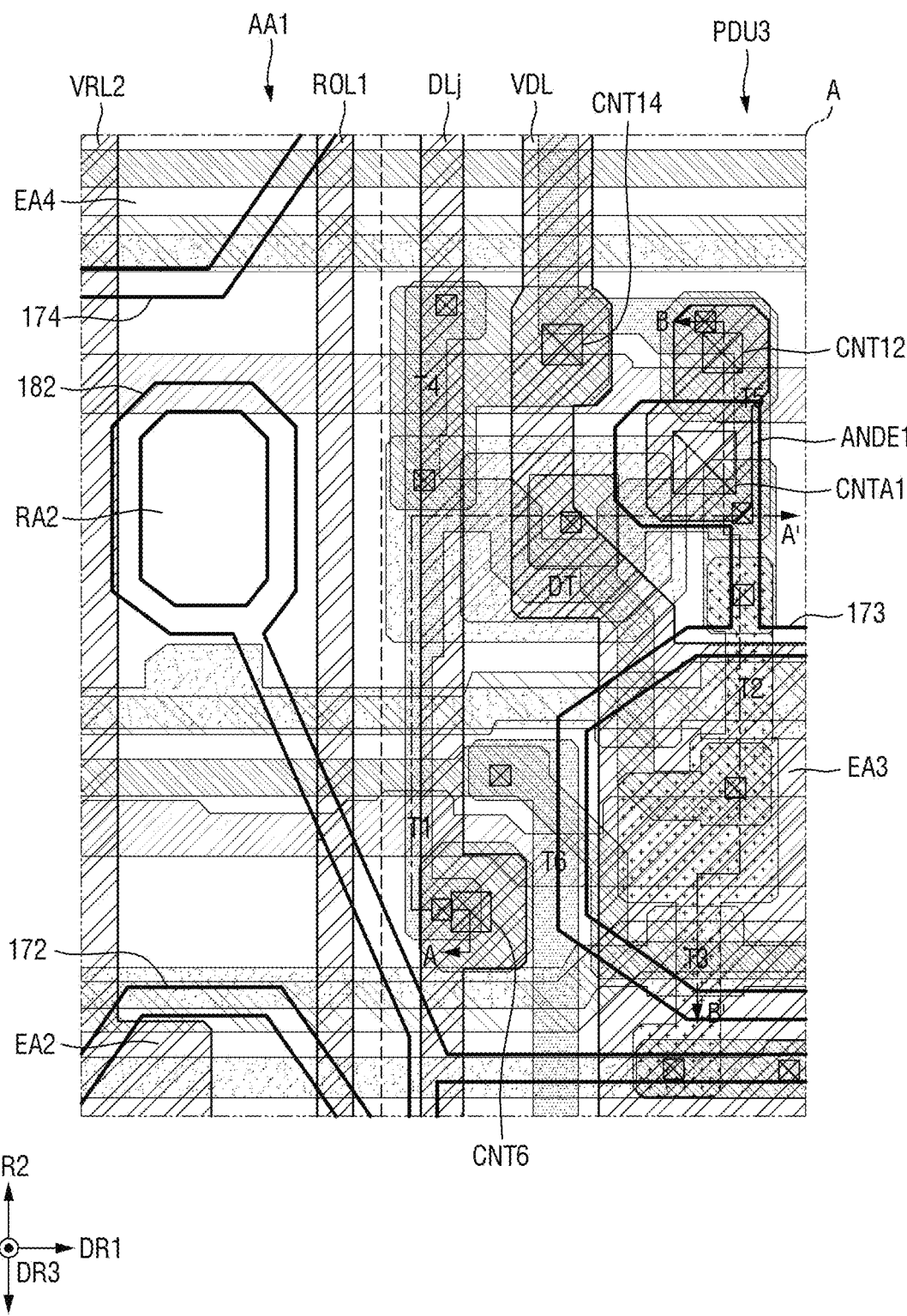
Figure 12:
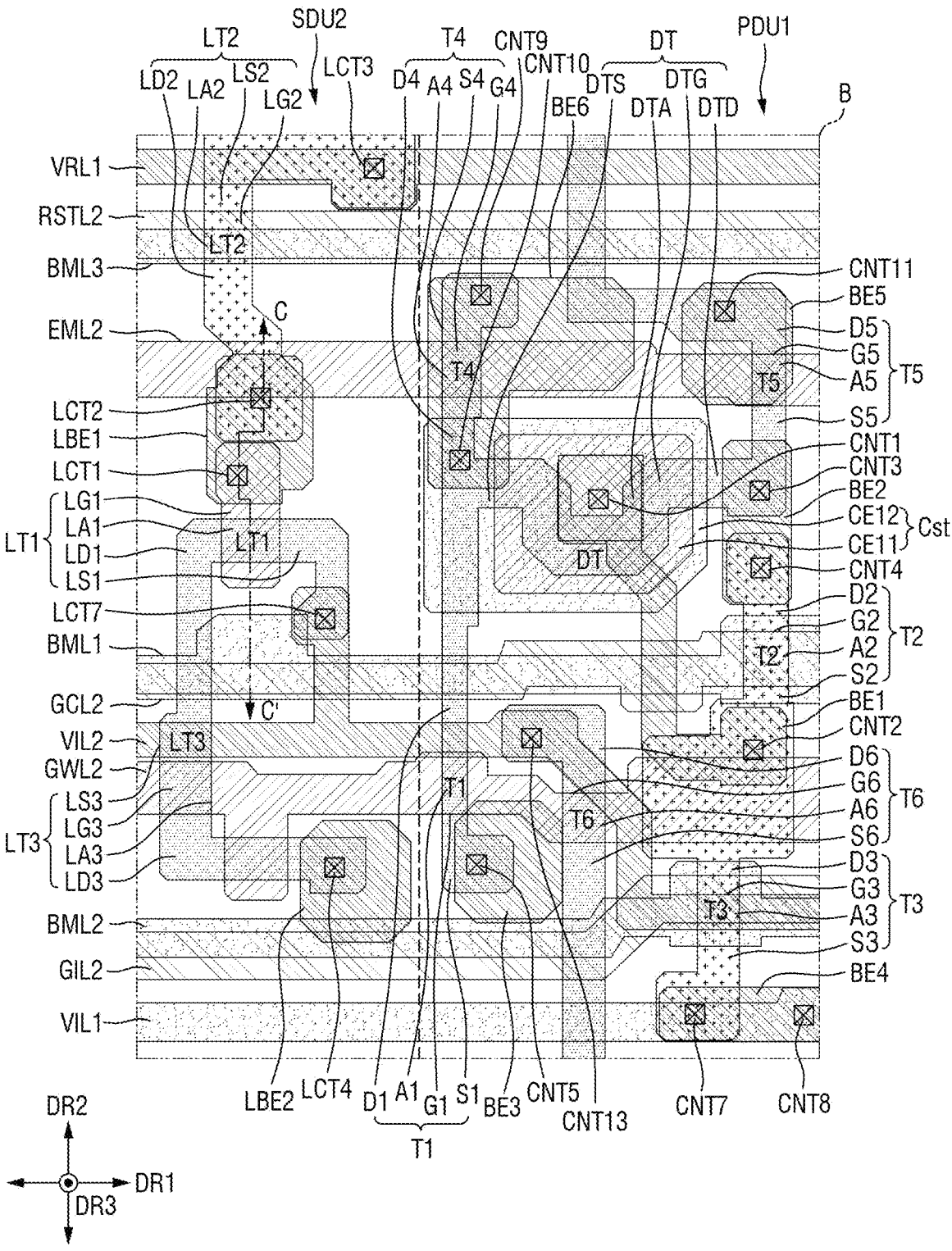
Figure 13:
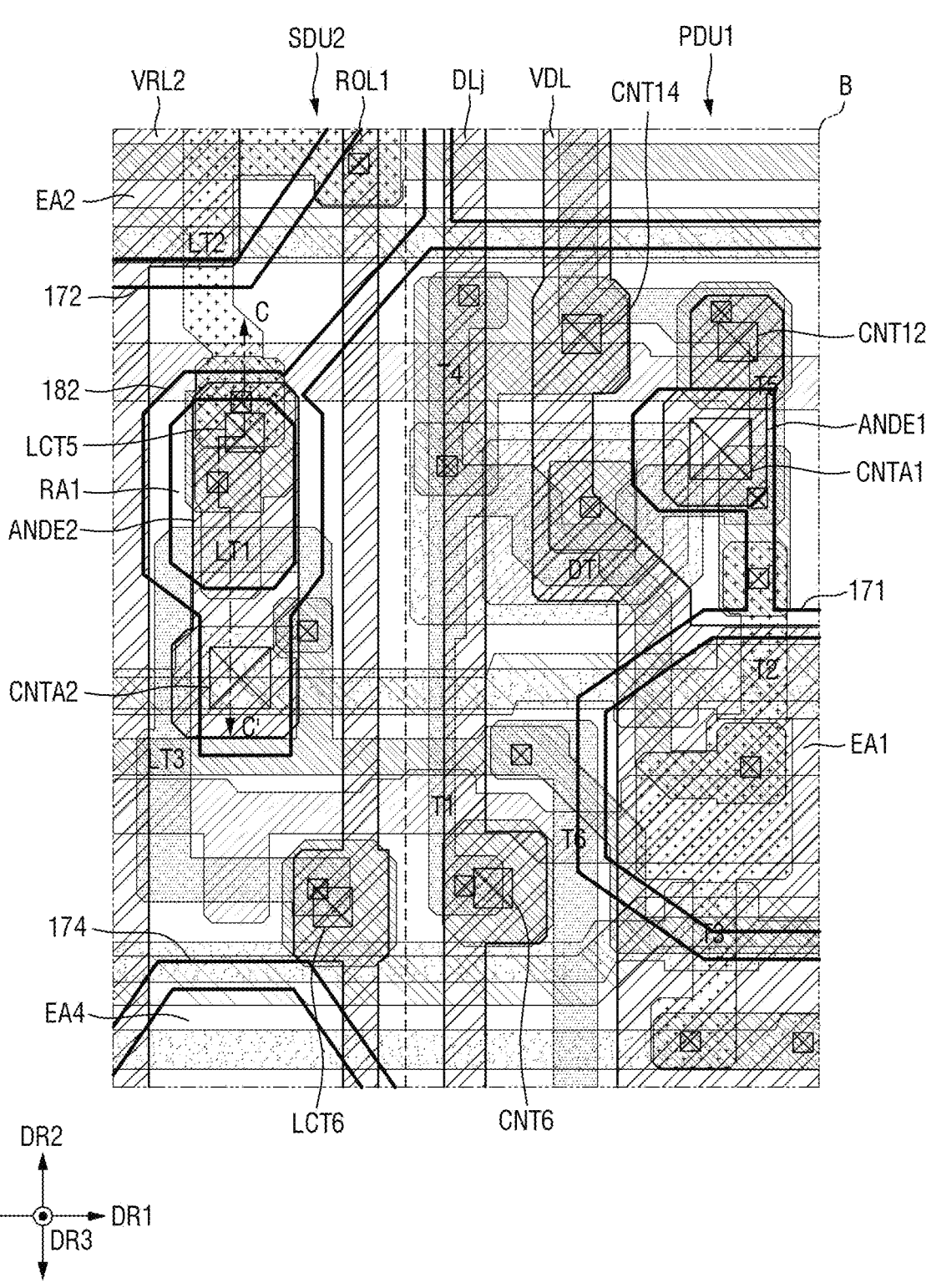
Figure 14:
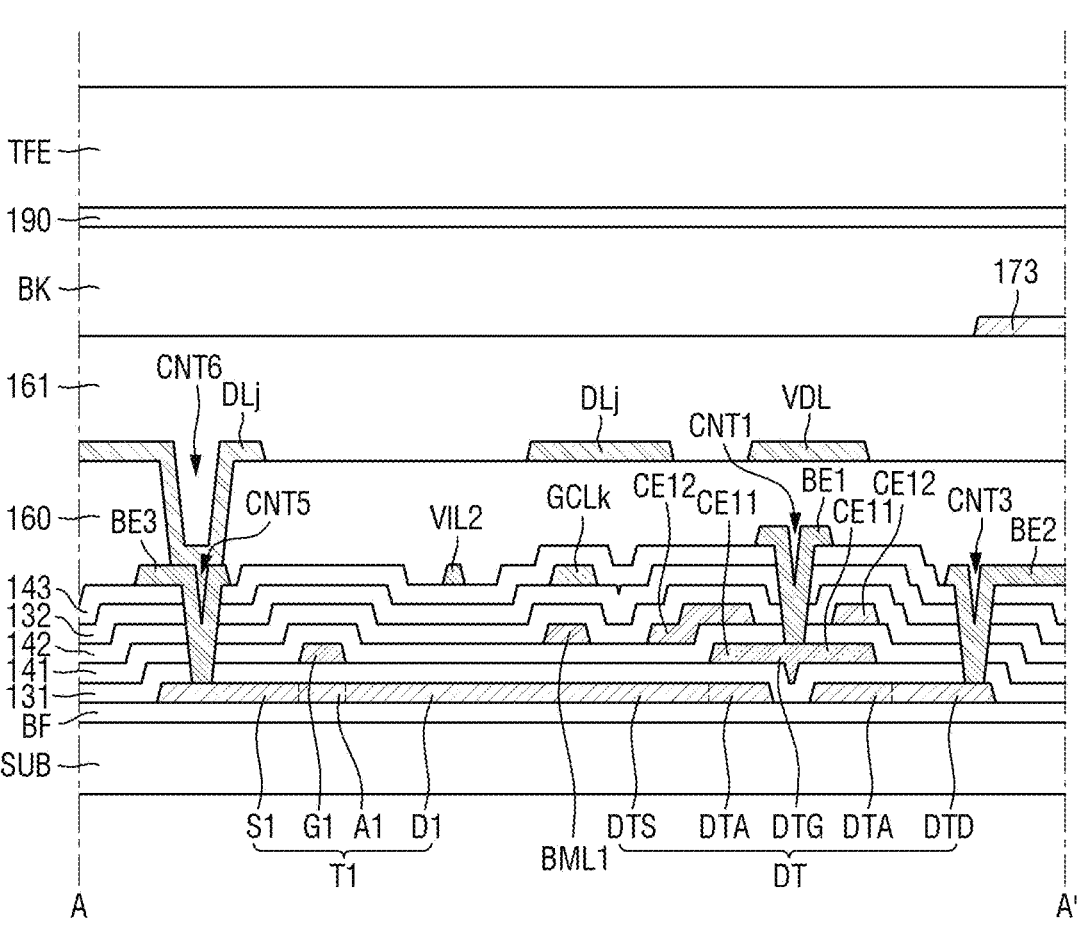
Figure 15:
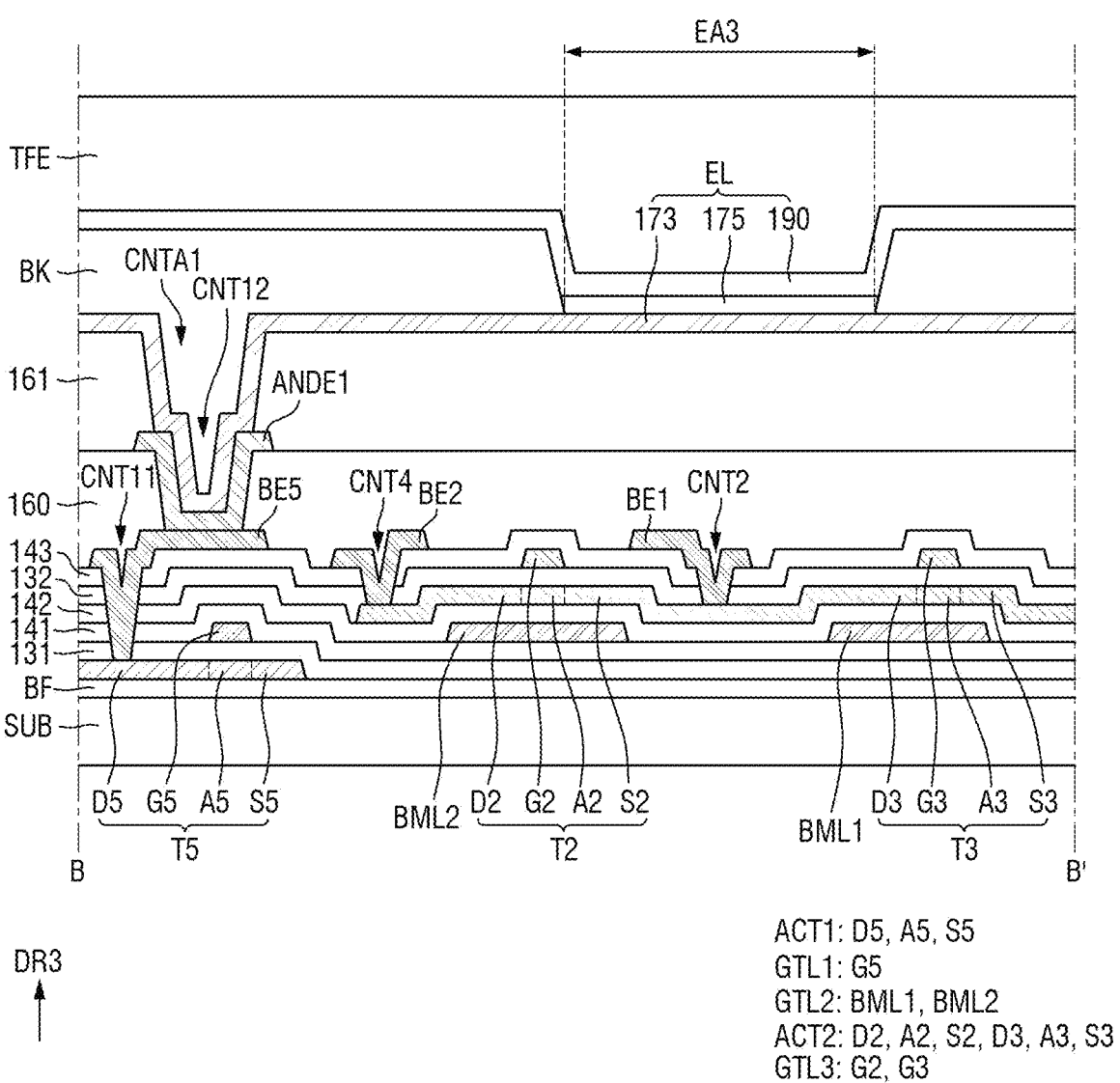
Figure 16:
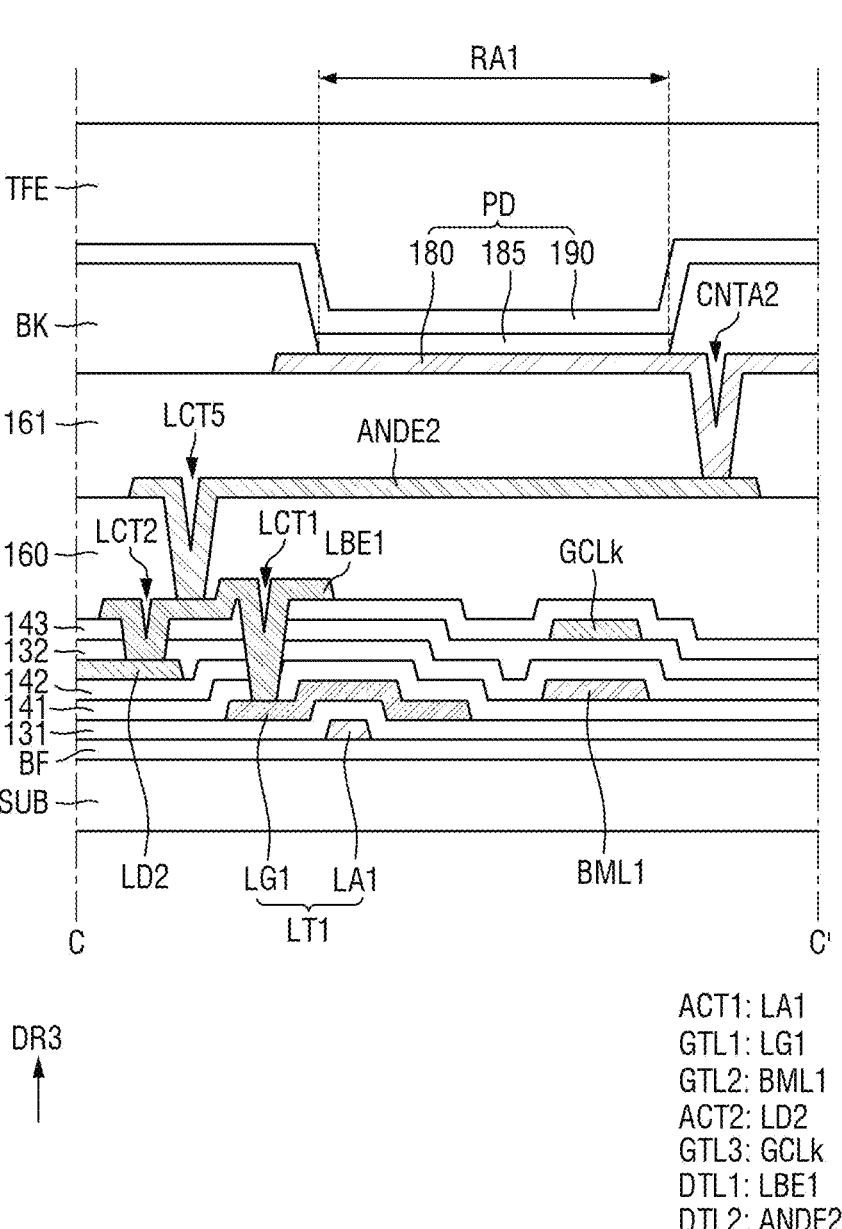
Figure 17:
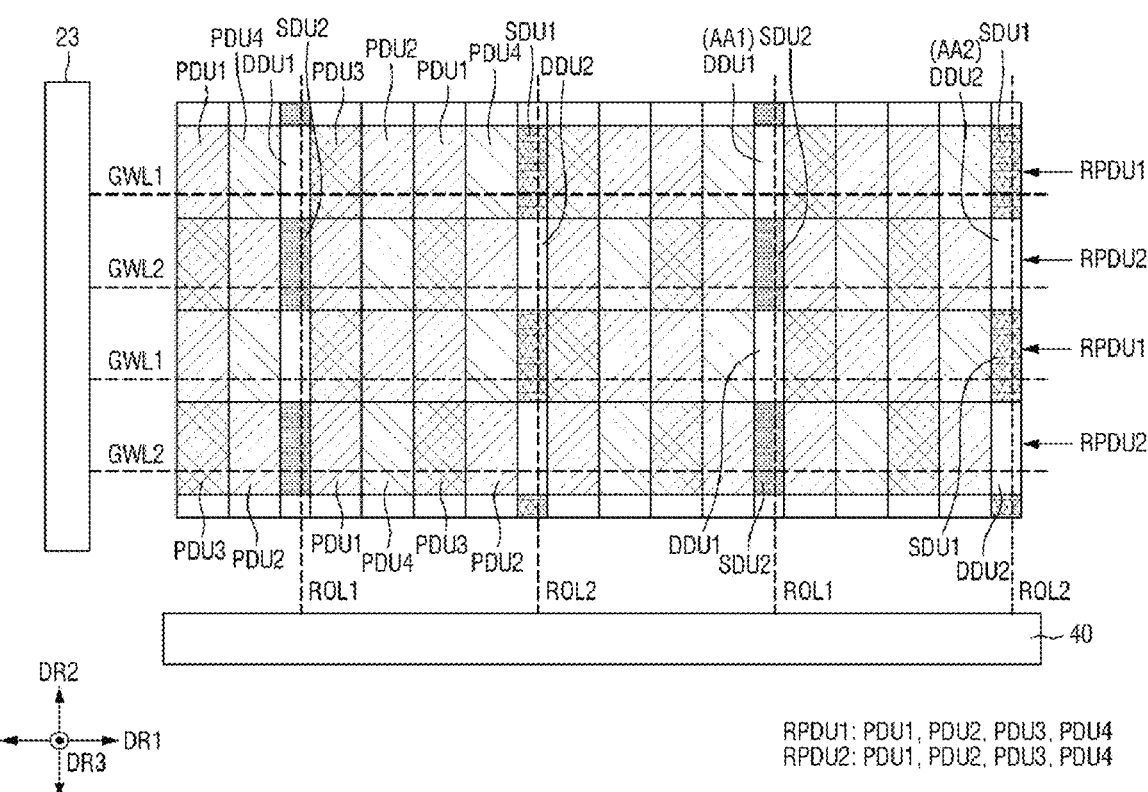
Figure 18:
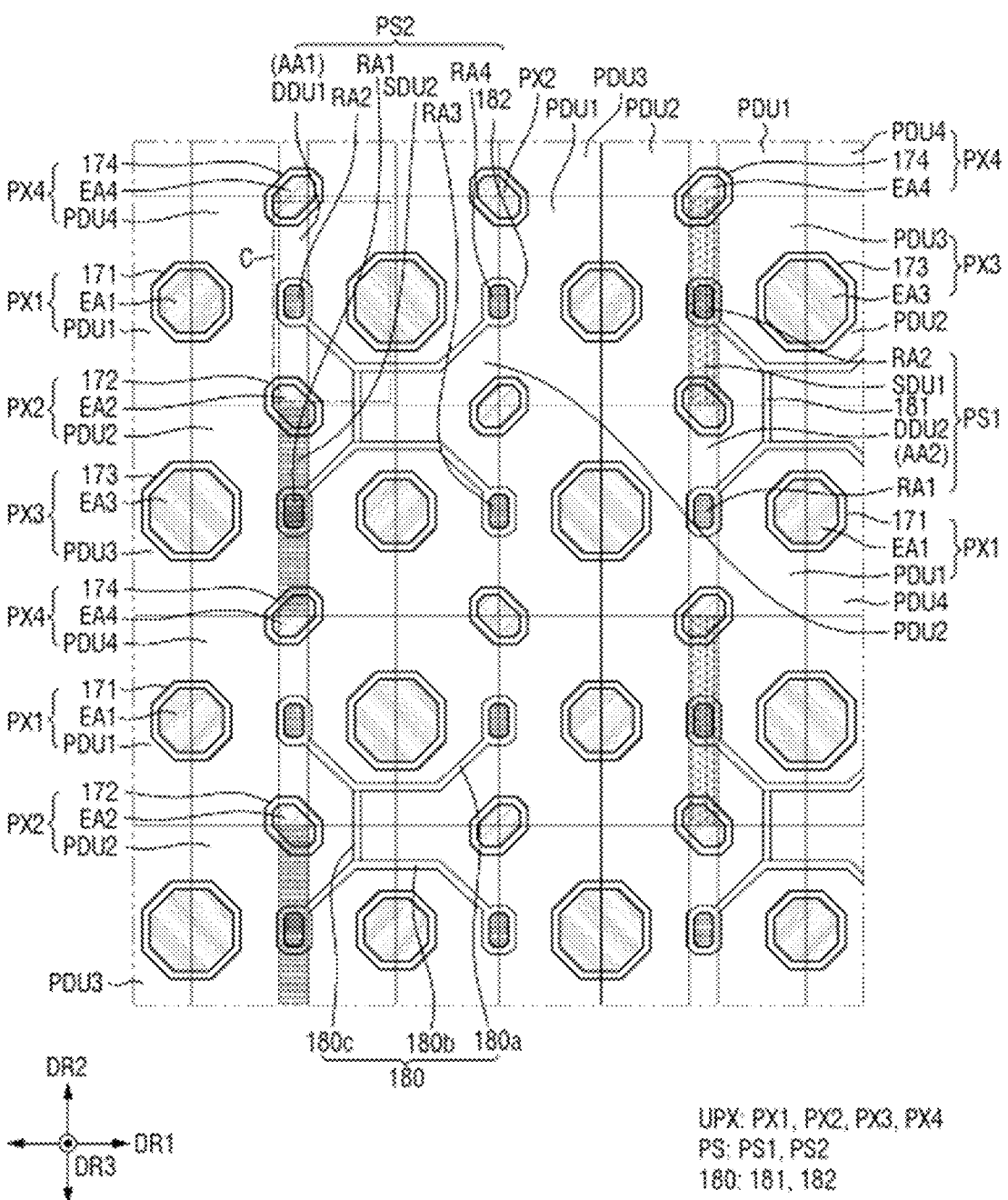
Figure 19:
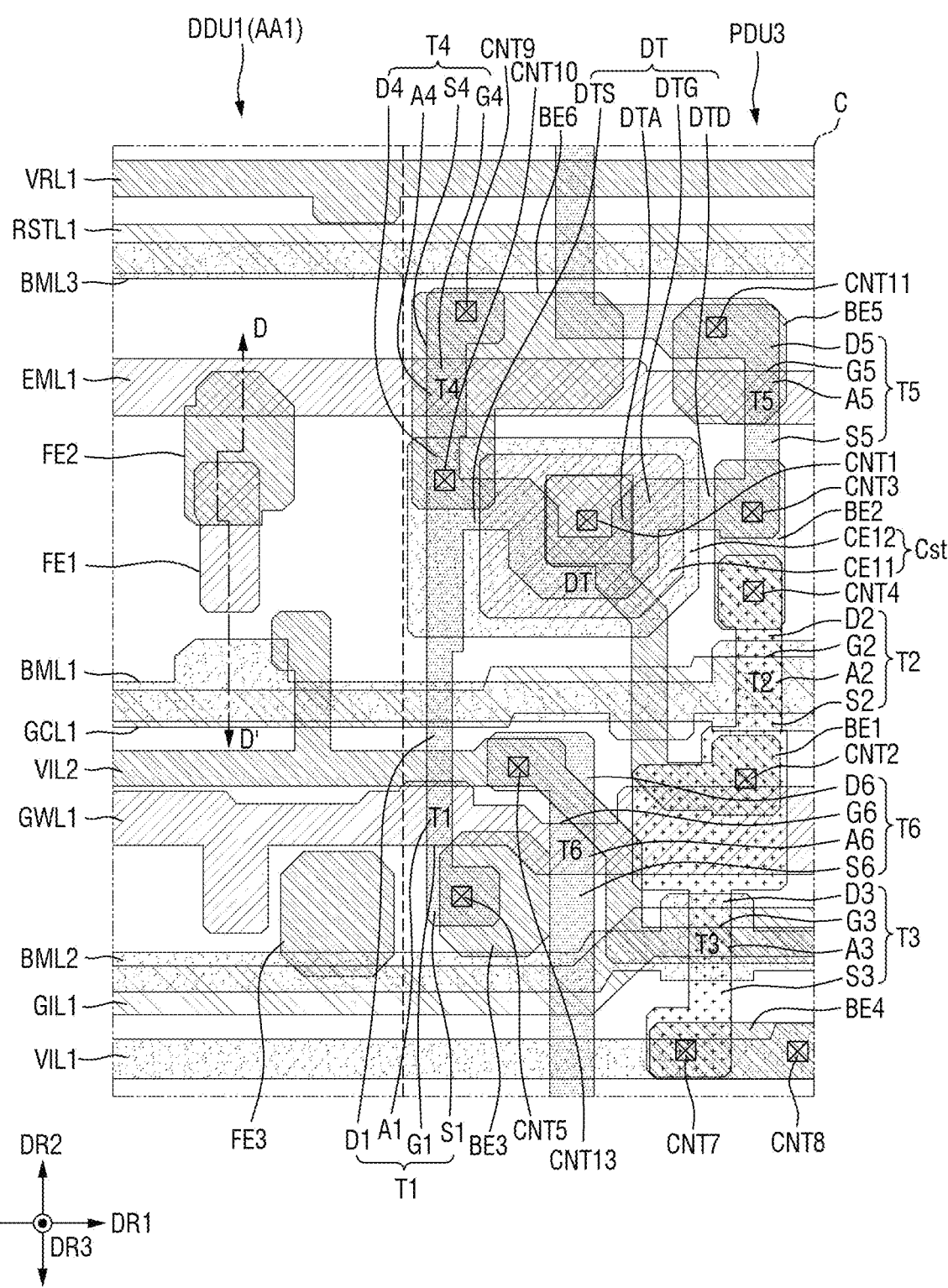
Figure 20:
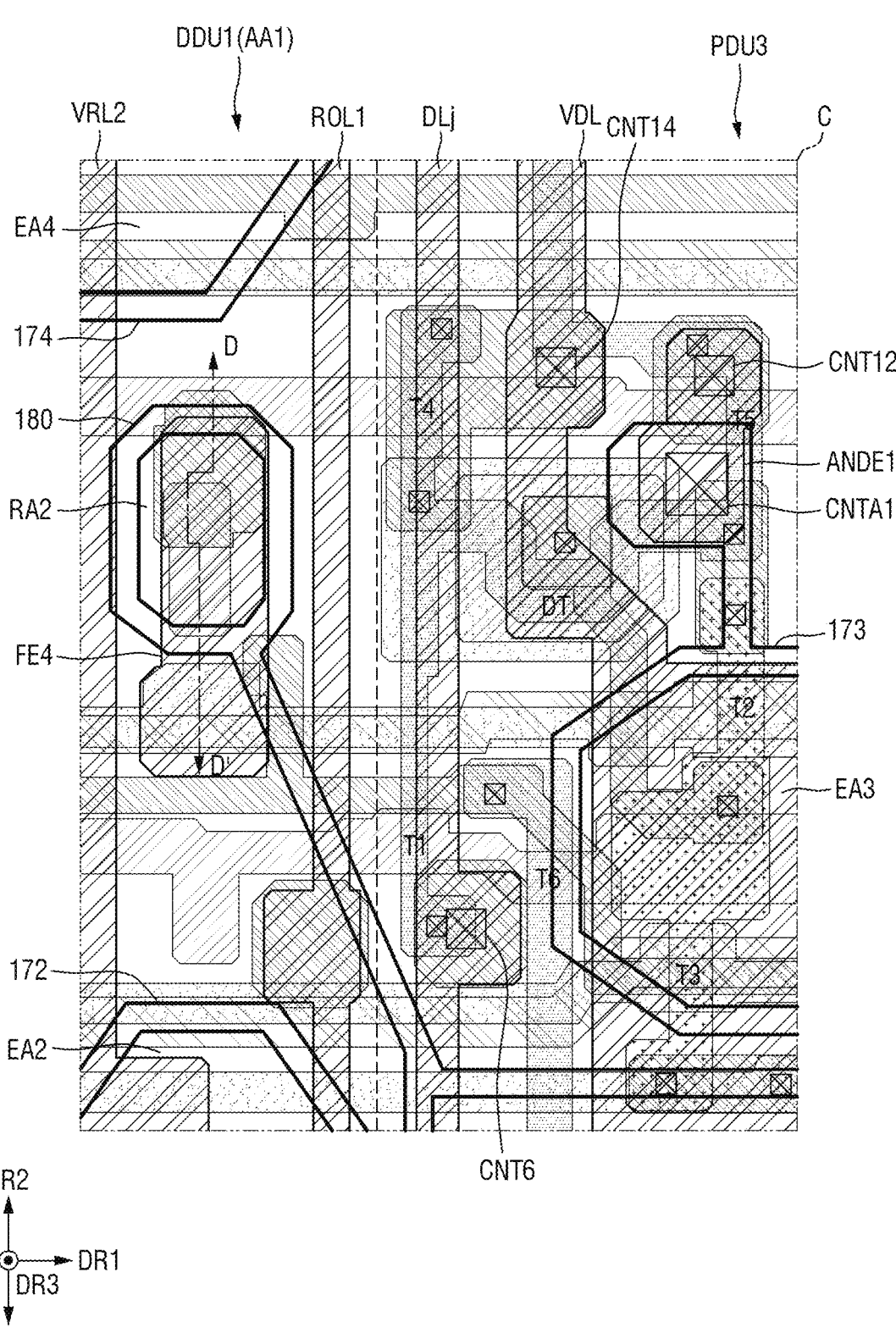
Figure 21:
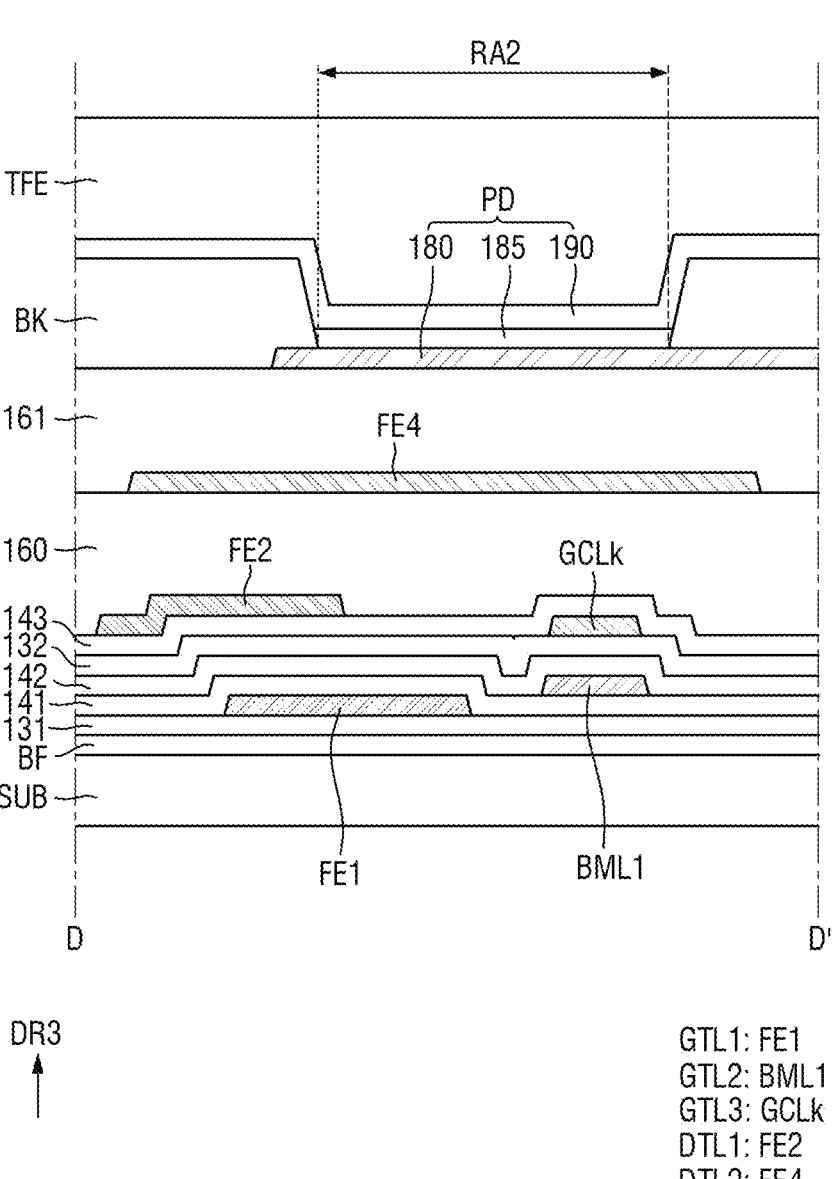
Figure 22:
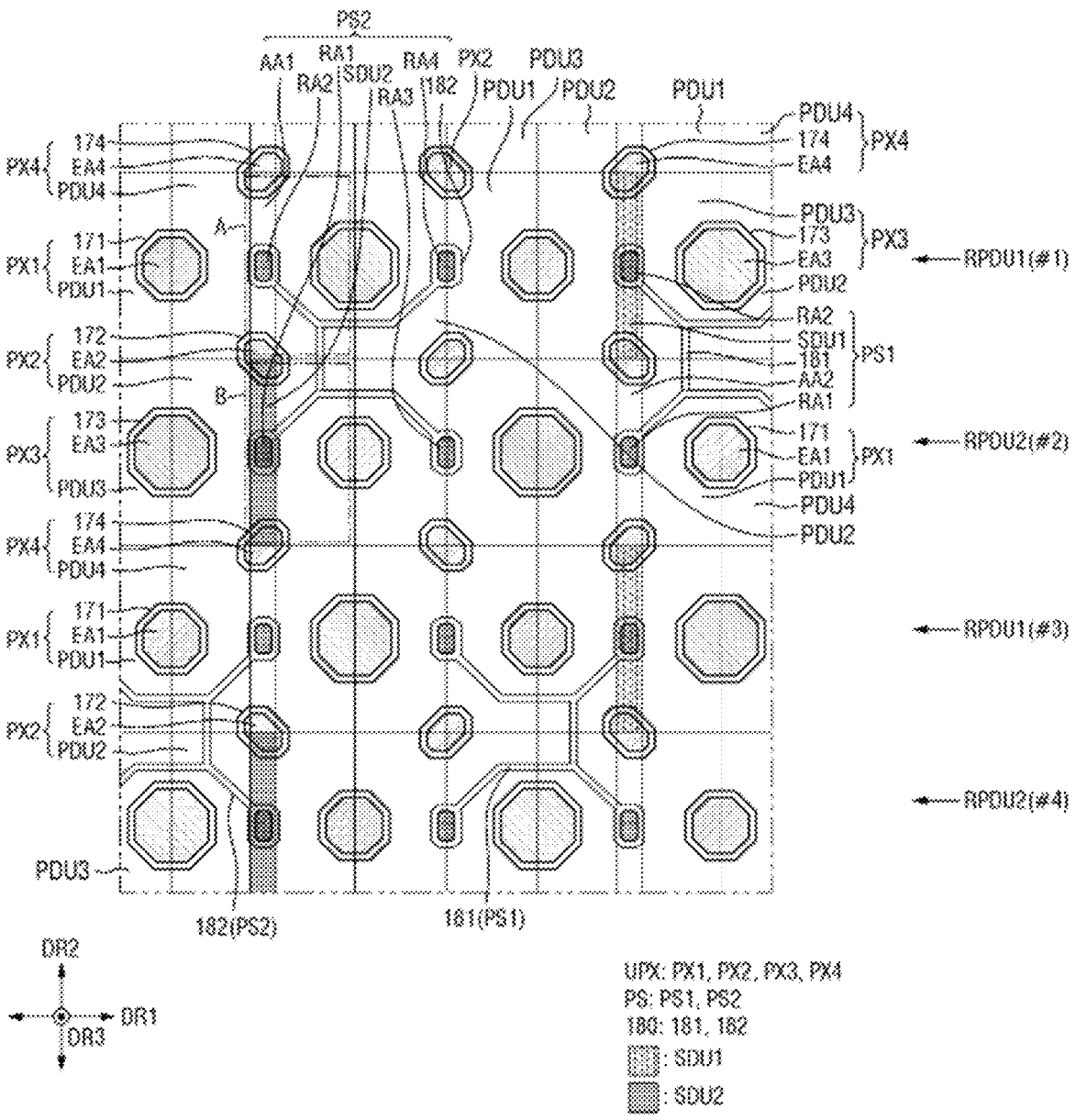

FIGS. 12 and 13 are detailed layout views of area B of FIG. 8;

FIG. 14 is an example of a cross-sectional view taken along the line A-A' of FIGS. 10 and 11;

FIG. 15 is an example of a cross-sectional view taken along the line B-B' of FIGS. 10 and 11;

FIG. 16 is an example of a cross-sectional view taken along the line C-C' of FIGS. 12 and 13;

FIG. 17 is a conceptual diagram illustrating the arrangement relationship between pixel drivers and sensing drivers according to one or more embodiments;

FIG. 18 is a layout view illustrating pixels and photo sensors of a display area of a display panel according to FIG. 17;

FIGS. 19 and 20 are detailed layout views of area C of FIG. 18;

FIG. 21 is an example of a cross-sectional view taken along the line D-D' of FIGS. 19 and 20; and FIG. 22 is a conceptual diagram illustrating the arrangement relationship between pixel drivers and sensing drivers according to one or more embodiments.

DETAILED DESCRIPTION

Aspects and features of embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "in plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component.

Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions, such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" may include A, B, or A and B. As used herein, the term "and/or" includes any and all combinations of one or more of the associated listed items. For example, the expression, such as "A and/or B" may include A, B, or A and B. Further, the use of "may" when describing embodiments of the present disclosure refers to "one or more embodiments of the present disclosure".

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random-access memory (RAM). The computer program instructions may also be stored in other non-transitory computer readable media, such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning for example consistent with their meaning in the context of the relevant art and/or the present specification, and should not be interpreted in an idealized or overly formal sense, unless expressly so defined herein.

Figure 1:
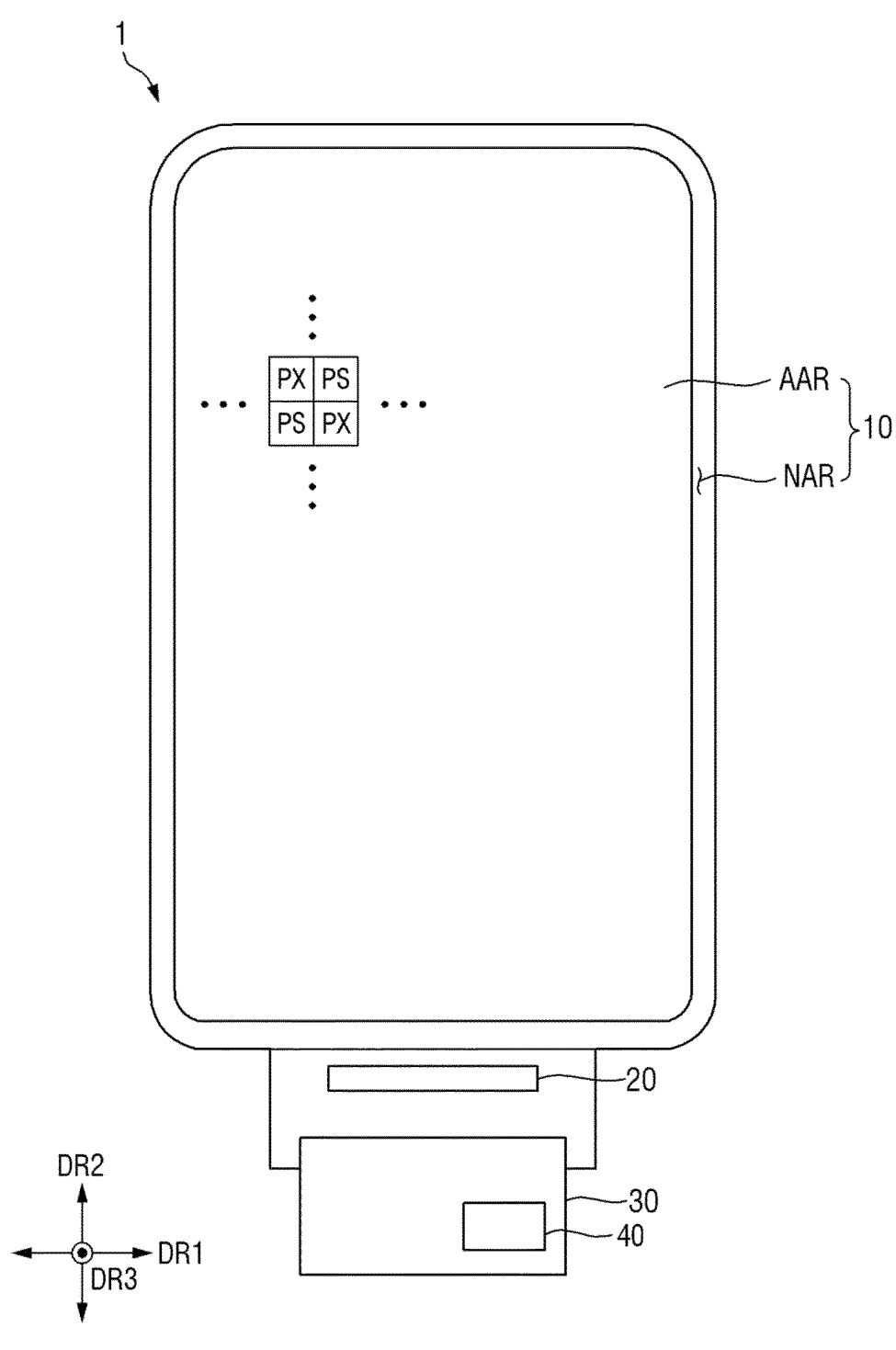
FIG. 1 is a plan view of a display device according to one or more embodiments.

FIG. 1 is a plan view of a display device 1 according to one or more embodiments.

In FIG. 1, a first direction DR1, a second direction DR2, and a third direction DR3 are shown. The first direction DR1 may be a direction parallel to a side of the display device 1 when seen in plan view, for example, a horizontal direction of the display device 1. The second direction DR2 may be a direction parallel to another side in contact with the above side of the display device 1 when seen in plan view, for example, a vertical direction of the display device 1. For ease of description, one side in the first direction DR1 is referred to as a right direction in plan view, the other side in the first direction DR1 is referred to as a left direction in plan view, one side in the second direction DR2 is referred to as an upward direction in plan view, and the other side in the second direction DR2 is referred to as a downward direction in plan view. The third direction DR3 may be a thickness direction of the display device 1. However, directions mentioned in embodiments should be understood as relative directions, and the embodiments are not limited to the mentioned directions.

Unless otherwise defined, the terms "upper" and "upper surface" used herein based on the third direction DR3 refer to a display surface side of a display panel 10, and the terms "lower," "lower surface," and "back surface" refer to an opposite side of the display panel 10 from the display surface side.

Referring to FIG. 1, examples of the display device 1 may include various electronic devices that provide a display screen. Examples of the display panel 10 may include, but are not limited to, a mobile phone, a smartphone, a tablet personal computer (PC), a mobile communication terminal, an electronic notebook, an electronic book, a personal digital assistant (PDA), a portable multimedia player (PMP), a navigation device, an ultra-mobile PC (UMPC), a television, a game console, a wristwatch-type electronic device, a head mounted display, a monitor of a PC, a notebook computer, a car dashboard, a digital camera, a camcorder, an external billboard, an electronic board, various medical devices, various inspection devices, various home appliances including a display area, such as a refrigerator and a washing machine, and an Internet of things (IoT) device. Representative examples of the display device 1 to be described later may include, but are not limited to, a smartphone, a tablet PC, and a notebook computer.

The display device 1 may include the display panel 10, a panel driving circuit 20, a circuit board 30, and a readout circuit 40.

The display device 1 includes the display panel 10 having an active area AAR and a non-active area NAR. The active area AAR includes a display area in which a screen is displayed. The active area AAR may completely overlap the display area. A plurality of pixels PX displaying an image may be located in the display area. Each pixel PX may include a light-emitting element EL (see FIG. 4).

In addition, the active area AAR further includes a fingerprint sensing area. The fingerprint sensing area is an area that reacts to light and an area configured to sense the amount or wavelength of incident light. The fingerprint sensing area may overlap the display area. For example, the fingerprint sensing area may be located only in a limited area suitable for fingerprint recognition within the active area AAR. In this case, the fingerprint sensing area may overlap a part of the display area, but may not overlap the other part of the display area. In another example, the fingerprint sensing area may be defined as an area exactly the same as the active area AAR. In this case, the entire active area AAR may be utilized as an area for fingerprint sensing. A plurality of photo sensors PS that react to light may be located in the fingerprint sensing area. Each of the photo sensors PS may include a light-sensing element PD (see FIG. 4) that senses incident light and that converts the incident light into an electrical signal.

The non-active area NAR is located around the active area AAR. The non-active area NAR may be a bezel area. The non-active area NAR may surround all sides (four sides in the drawing) of the active area AAR, but the present disclosure is not limited thereto.

The non-active area NAR may be located around the active area AAR. The panel driving circuit 20 may be located in the non-active area NAR. The panel driving circuit 20 may drive the pixels PX and/or the photo sensors PS. The panel driving circuit 20 may output signals and voltages for driving the display panel 10. The panel driving circuit 20 may be formed as an integrated circuit and may be mounted on the display panel 10. In the non-active area NAR, there may be signal lines for transmitting signals between the panel driving circuit 20 and the active area AAR. In another example, the panel driving circuit 20 may be mounted on the circuit board 30.

In addition, signal lines or the readout circuit 40 for transmitting signals to the active area AAR may be located in the non-active area NAR. The readout circuit 40 may be connected to each photo sensor PS through a signal line, and may receive a current flowing through each photo sensor PS to sense a user's fingerprint input. The readout circuit 40 may be formed as an integrated circuit and attached onto a display circuit board using a chip on film (COF) method. However, the present disclosure is not limited thereto, and the readout circuit 40 may also be attached onto the non-active area NAR of the display panel 10 using a chip on glass (COG) method, a chip on plastic (COP) method, or an ultrasonic bonding method.

The circuit board 30 may be attached to an end of the display panel 10 using an anisotropic conductive film (ACF). Lead lines of the circuit board 30 may be electrically connected to a pad portion of the display panel 10. The circuit board 30 may be a flexible film, such as a flexible printed circuit board or a chip on film.

Figure 2:
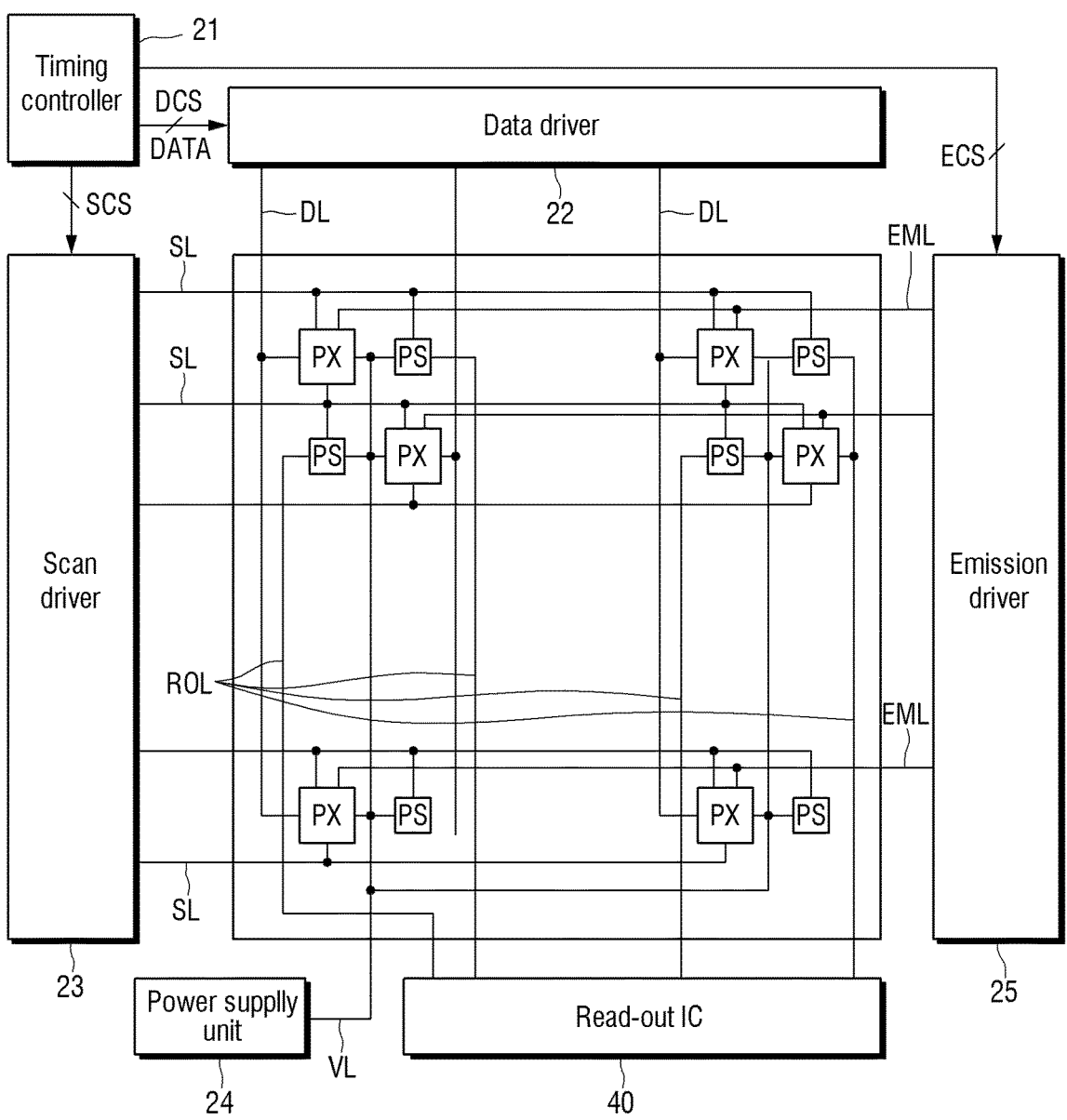
FIG. 2 is a block diagram of the display device according to one or more embodiments.

FIG. 2 is a block diagram of the display device 1 according to one or more embodiments.

Referring to FIG. 2, the pixels PX and the photo sensors PS located in the active area AAR of the display panel 10 may be driven by the panel driving circuit 20.

The panel driving circuit 20 includes a data driver 22 for driving the pixels PX of the display panel 10, a scan driver 23 for driving the pixels PX and the photo sensors PS, and a timing controller 21 for controlling respective driving timings of the data driver 22 and the scan driver 23. In addition, the panel driving circuit 20 may further include a power supply unit 24 and an emission control driver 25.

The timing controller 21 receives an image signal supplied from outside the display device 1. The timing controller 21 may output image data DATA and a data control signal DCS to the data driver 22. In addition, the timing controller 21 may generate a scan control signal SCS for controlling the operation timing of the scan driver 23, and may generate an emission control driving signal ECS for controlling the operation timing of the emission control driver 25. For example, the timing controller 21 may generate the scan control signal SCS and the emission control driving signal ECS, and may output the scan control signal SCS to the scan driver 23 through a scan control line, and may output the emission control driving signal ECS to the emission control driver 25 through an emission control driving wiring.

The data driver 22 may convert the image data DATA into analog data voltages, and may output the analog data voltages to data lines DL. The scan driver 23 may generate scan signals according to the scan control signal SCS, and may sequentially output the scan signals to scan lines SL.

The power supply unit 24 may generate a driving voltage ELVDD (see FIG. 4), and may supply the driving voltage ELVDD to a power supply voltage line VL, and may generate a common voltage ELVSS (see FIG. 4), and may supply the common voltage ELVSS to the power supply voltage line VL. The power supply voltage line VL may include a driving voltage line and a common voltage wiring. The driving voltage ELVDD may be a high potential voltage for driving a light-emitting element and a light-sensing element, and the common voltage ELVSS may be a low potential voltage for driving the light-emitting element and the light-sensing element. That is, the driving voltage ELVDD may have a higher potential than the common voltage ELVSS.

The emission control driver 25 may generate emission control signals according to the emission control driving signal ECS, and may sequentially output the emission control signals to emission control lines EML. Although the emission control driver 25 is illustrated as being separate from the scan driver 23, the present disclosure is not limited thereto, and the emission control driver 25 may also be included in the scan driver 23.

The readout circuit 40 may be connected to each photo sensor PS through a readout line ROL and may receive a current flowing through each photo sensor PS to sense a user's fingerprint input. The readout circuit 40 may generate fingerprint-sensing data according to the magnitude of a current sensed by each photo sensor PS and transmit the fingerprint-sensing data to a processor. The processor may analyze the fingerprint-sensing data, and may determine whether the fingerprint-sensing data matches a user's fingerprint by comparing the fingerprint-sensing data with a preset fingerprint. When the preset fingerprint and the fingerprint-sensing data transmitted from the readout circuit 40 are the same, preset functions may be performed.

The display panel 10 further includes a plurality of pixels PX, a plurality of photo sensors PS, a plurality of scan lines SL connected to the pixels PX and to the photo sensors PS, a plurality of data lines DL and a plurality of emission control lines EML connected to the pixels PX, and a plurality of readout lines ROL connected to the photo sensors PS.

Each of the pixels PX may be connected to at least any one of the scan lines SL, any one of the data lines DL, at least one of the emission control lines EML, and the power supply voltage line VL.

Each of the photo sensors PS may be connected to any one of the scan lines SL, to any one of the readout lines ROL, and to the power supply voltage line VL.

The scan lines SL may connect the scan driver 23 to the pixels PX and to the photo sensors PS. The scan lines SL may provide scan signals output from the scan driver 23 to the pixels PX and to the photo sensors PS.

The data lines DL may connect the data driver 22 to the pixels PX. The data lines DL may provide image data output from the data driver 22 to the pixels PX.

The emission control lines EML may connect the emission control driver 25 to the pixels PX. The emission control lines EML may provide emission control signals output from the emission control driver 25 to the pixels PX.

The readout lines ROL may connect the photo sensors PS to the readout circuit 40. The readout lines ROL may provide a sensing current generated according to a photocurrent output from each of the photo sensors PS to the readout circuit 40. Accordingly, the readout circuit 40 may sense a user's fingerprint.

A plurality of power supply voltage lines VL may connect the power supply unit 24 to the pixels PX and the photo sensors PS. The power supply voltage lines VL may provide the driving voltage ELVDD or the common voltage ELVSS received from the power supply unit 24 to the pixels PX and to the photo sensors PS.

Figure 3:
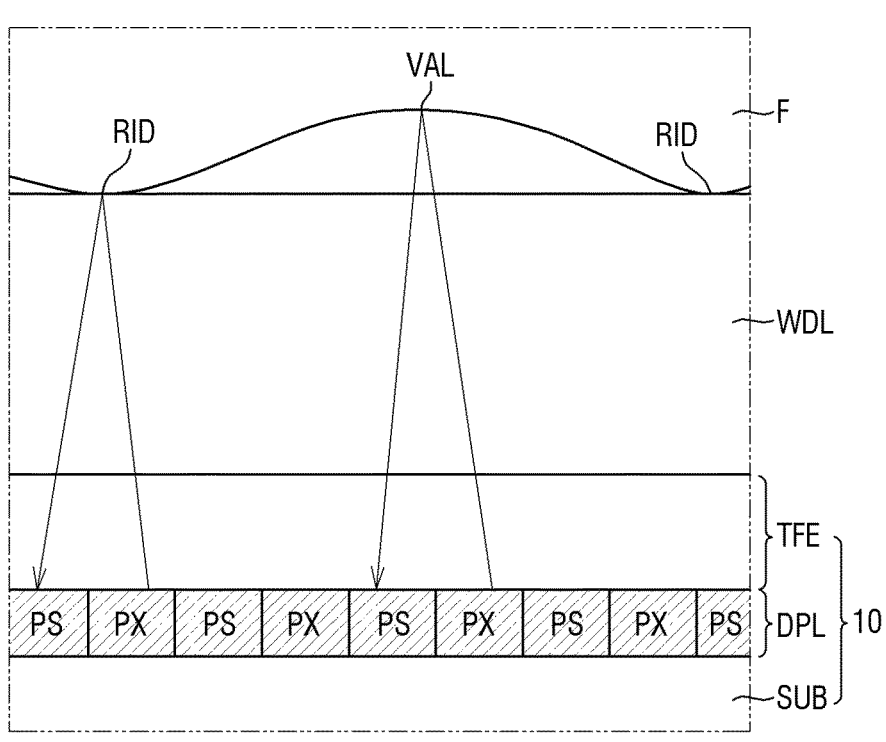
FIG. 3 is a diagram illustrating fingerprint sensing of the display device according to one or more embodiments.
Figure 3:

FIG. 3 is a diagram illustrating fingerprint sensing of the display device 1 according to one or more embodiments.

Referring to FIG. 3, the display device 1 may further include a window WDL located on the display panel 10. The display panel 10 may include a substrate SUB, a display layer DPL located on the substrate SUB and including the pixels PX and the photo sensors PS, and an encapsulation layer TFE located on the display layer DPL.

When a user's finger touches an upper surface of the window WDL of the display device 1, light output from the pixels PX of the display panel 10 may be reflected by ridges RID, and by valleys VAL between the ridges RID of the user's fingerprint F. In this case, the ridge portions RID of the fingerprint F contact the upper surface of the window WDL, but the valley portions VAL of the fingerprint F do not contact the window WDL. That is, the upper surface of the window WDL contacts air in the valley portions VAL.

Here, because a refractive index of the fingerprint F and a refractive index of air are different, the amount of light reflected from the ridges RID of the fingerprint F and the amount of light reflected from the valleys VAL may be different. Accordingly, the ridge portions RID and the valley portions VAL of the fingerprint F may be distinguished based on a difference in the amount of reflected light, that is, the amount of light incident on the photo sensors PS. Because the photo sensors PS output electrical signals (e.g., photocurrents) according to the difference in the amount of light, a fingerprint pattern of the finger can be identified.

Figure 4:
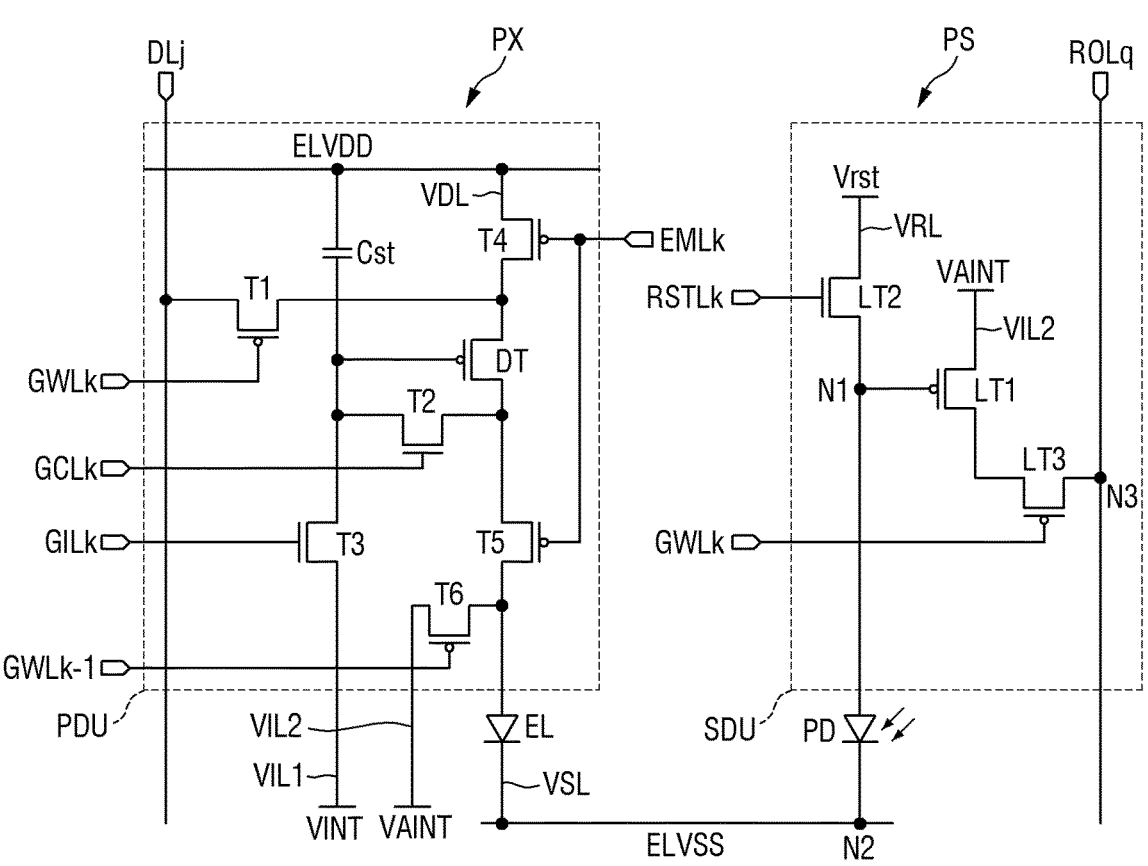
FIG. 4 is a circuit diagram of a pixel and a photo sensor according to one or more embodiments.

FIG. 4 is a circuit diagram of a pixel PX and a photo sensor PS according to one or more embodiments.

FIG. 4 illustrates a circuit diagram of a pixel PX connected to a $k^{th}$ scan initialization line GILk, to a $k^{th}$ scan line GWLk, to a $k^{th}$ scan control line GCLk, to a $(k-1)^{th}$ scan line GWLk−1, and to a $j^{th}$ data line DLj, and of a photo sensor PS connected to the $k^{th}$ scan line GWLk, to a $k^{th}$ reset control line RSTLk, and to a $q^{th}$ readout line ROLq.

The pixel PX may include a light-emitting element EL, and a pixel driver PDU for controlling the amount of light emitted from the light-emitting element EL. The light-emitting element EL includes a light-emitting portion EA1, EA2, EA3, or EA4 (see FIG. 8) that emits light. The pixel driver PDU may include a driving transistor DT, a plurality of switch elements, and a first capacitor Cst. The switch elements include first through sixth transistors T1 through T6.

The driving transistor DT may include a gate electrode, a first electrode, and a second electrode. The driving transistor DT may control a source-drain current (hereinafter, referred to as a "driving current") flowing between the first electrode and the second electrode according to a data voltage applied to the gate electrode. The driving current flowing through a channel of the driving transistor DT is proportional to the square of a difference between a voltage Vgs between the first electrode and the gate electrode of the driving transistor DT and a threshold voltage.

The light-emitting element EL emits light according to the driving current. As the driving current increases, the amount of light emitted from the light-emitting element EL may increase.

The light-emitting element EL may be an organic light-emitting diode including an organic light-emitting layer located between an anode and a cathode. Alternatively, the light-emitting element EL may be a quantum dot light-emitting element including a quantum dot light-emitting layer located between an anode and a cathode. Alternatively, the light-emitting element EL may be an inorganic light-emitting element including an inorganic semiconductor located between an anode and a cathode. When the light-emitting element EL is an inorganic light-emitting element, it may include a micro light-emitting diode or a nano light-emitting diode. In FIG. 15, the anode of the light-emitting element EL corresponds to a pixel electrode 171, 172, 173, or 174, and the cathode corresponds to a common electrode 190.

The anode of the light-emitting element EL may be connected to a second electrode of the fifth transistor T5 and to a first electrode of the sixth transistor T6, and the cathode of the light-emitting element EL may be connected to a common voltage line VSL to which the common voltage ELVSS is applied.

The first transistor T1 is turned on by a $k^{th}$ scan signal of the $k^{th}$ scan line GWLk to connect the first electrode of the driving transistor DT to the $j^{th}$ data line DLj. Accordingly, a data voltage of the $j^{th}$ data line DLj may be applied to the first electrode of the driving transistor DT. The first transistor T1 may have a gate electrode connected to the $k^{th}$ scan line GWLk, a first electrode connected to the $j^{th}$ data line DLj, and a second electrode connected to the first electrode of the driving transistor DT.

The second transistor T2 is turned on by a $k^{th}$ scan control signal of the $k^{th}$ scan control line GCLk to connect the gate electrode of the driving transistor DT to the second electrode of the driving transistor DT. When the gate electrode and the second electrode of the driving transistor DT are connected, the driving transistor DT is driven as a diode. The second transistor T2 may have a gate electrode connected to the $k^{th}$ scan control line GCLk, a first electrode connected to the gate electrode of the driving transistor DT, and a second electrode connected to the second electrode of the driving transistor DT.

The third transistor T3 is turned on by a $k^{th}$ scan initialization signal of the $k^{th}$ scan initialization line GILk to connect the gate electrode of the driving transistor DT to a first initialization voltage line VIL1. Accordingly, a first initialization voltage of the first initialization voltage line VIL1 may be applied to the gate electrode of the driving transistor DT. The third transistor T3 may have a gate electrode connected to the $k^{th}$ scan initialization line GILk, a first electrode connected to the first initialization voltage line VIL1, and a second electrode connected to the gate electrode of the driving transistor DT.

The fourth transistor T4 is turned on by a $k^{th}$ emission control signal of a $k^{th}$ emission control line EMLk to connect the first electrode of the driving transistor DT to a driving voltage line VDL to which the driving voltage ELVDD is applied. The fourth transistor T4 may have a gate electrode connected to the $k^{th}$ emission control line EMLk, a first electrode connected to the driving voltage line VDL, and a second electrode connected to the first electrode of the driving transistor DT.

The fifth transistor T5 is turned on by the $k^{th}$ emission control signal of the $k^{th}$ emission control line EMLk to connect the second electrode of the driving transistor DT to the anode of the light-emitting element EL. The fifth transistor T5 may have a gate electrode connected to the $k^{th}$ emission control line EMLk, a first electrode connected to the second electrode of the driving transistor DT, and the second electrode connected to the anode of the light-emitting element EL.

When both the fourth transistor T4 and the fifth transistor T5 are turned on, the driving current of the driving transistor DT according to the voltage of the gate electrode of the driving transistor DT may flow to the light-emitting element EL.

The sixth transistor T6 is turned on by a $(k-1)^{th}$ scan signal of the $(k-1)^{th}$ scan line GWLk−1 to connect the anode of the light-emitting element EL to a second initialization voltage line VIL2. A second initialization voltage VAINT of the second initialization voltage line VIL2 may be applied to the anode of the light-emitting element EL. The sixth transistor T6 may have a gate electrode connected to the $(k-1)^{th}$ scan line GWLk−1, the first electrode connected to the anode of the light-emitting element EL, and a second electrode connected to the second initialization voltage line VIL2.

The first capacitor Cst is formed between the gate electrode of the driving transistor DT and the driving voltage line VDL. A first capacitor electrode of the first capacitor Cst may be connected to the gate electrode of the driving transistor DT, and a second capacitor electrode of the first capacitor Cst may be connected to the driving voltage line VDL.

When the first electrode of any of the driving transistor DT and the first through sixth transistors T1 through T6 is a source electrode, the second electrode may be a drain electrode. Alternatively, when the first electrode of any of the driving transistor DT and the first through sixth transistors T1 through T6 is a drain electrode, the second electrode may be a source electrode.

An active layer of each of the driving transistor DT and the first through sixth transistors T1 through T6 may be made of any one of polysilicon, amorphous silicon, and an oxide semiconductor. For example, the active layer of each of the driving transistor DT, the first transistor T1, and the fourth through sixth transistors T4 through T6 may be made of polysilicon. The active layer of each of the second transistor T2 and the third transistor T3 may be made of an oxide semiconductor. In this case, the driving transistor DT, the first transistor T1, and the fourth through sixth transistors T4 through T6 may be formed as P-type metal oxide semiconductor field effect transistors (MOSFETs), and the second transistor T2 and the third transistor T3 may be formed as N-type MOSFETs.

Each photo sensor PS may include a light-sensing element PD and a sensing driver SDU for controlling a sensing current according to a photocurrent of the light-sensing element PD. The light-sensing element PD includes light-sensing portions RA1 through RA4 (see FIG. 8) that sense external light. The sensing driver SDU may include a plurality of sensing transistors and various signal lines for controlling a sensing current generated by the light-sensing element PD. The sensing transistors may include first through third sensing transistors LT1 through LT3.

Each light-sensing element PD may be a photodiode including a sensing anode, a sensing cathode, and a photoelectric conversion layer located between the sensing anode and the sensing cathode. Each light-sensing element PD may convert light incident from the outside into an electrical signal. The light-sensing element PD may be an inorganic photodiode or phototransistor made of an inorganic material of a pn type or a pin type. Alternatively, the light-sensing element PD may be an organic photodiode including an electron donor material that generates donor ions, and an electron acceptor material that generates acceptor ions. In FIG. 16, the sensing anode of the light-sensing element PD corresponds to a sensing electrode 180, and the sensing cathode of the light-sensing element PD corresponds to the common electrode 190.

The light-sensing element PD may generate photocharges when exposed to external light, and the generated photocharges may be accumulated in the sensing anode of the light-sensing element PD. In this case, a voltage of a first node N1 electrically connected to the sensing anode may increase. When the light-sensing element PD and the $q^{th}$ readout line ROLq are connected according to the turn-on of the first and third sensing transistors LT1 and LT3, a sensing voltage may be accumulated in a third node N3 between the $q^{th}$ readout line ROLq and the third sensing transistor LT3 in proportion to the voltage of the first node N1 in which electric charges are accumulated.

The first sensing transistor LT1 may be turned on by the voltage of the first node N1 applied to a gate electrode to connect the second initialization voltage line VIL2 and a second electrode of the third sensing transistor LT3. The first sensing transistor LT1 may have the gate electrode connected to the first node N1, a first electrode connected to the second initialization voltage line VIL2, and a second electrode connected to a first electrode of the third sensing transistor LT3. The first sensing transistor LT1 may be a source follower amplifier that generates a source-drain current in proportion to the amount of charge of the first node N1 input to the gate electrode. Although the first electrode of the first sensing transistor LT1 is illustrated as being connected to the second initialization voltage line VIL2 line, the present disclosure is not limited thereto, and the first electrode of the first sensing transistor LT1 may also be connected to the driving voltage line VDL or the first initialization voltage line VIL1.

The second sensing transistor LT2 may be turned on by a $k^{th}$ reset control signal of the $k^{th}$ reset control line RSTLk to connect the first node N1 to a reset voltage line VRL for applying a reset voltage Vrst. The second sensing transistor LT2 may have a gate electrode connected to the $k^{th}$ reset control line RSTLk, a first electrode connected to the reset voltage line VRL, and a second electrode connected to the first node N1.

The third sensing transistor LT3 may be turned on by the $k^{th}$ scan signal of the $k^{th}$ scan line GWLk to connect the second electrode of the first sensing transistor LT1 and the $q^{th}$ readout line ROLq. The third sensing transistor LT3 may have a gate electrode connected to the $k^{th}$ scan line GWLk, the first electrode connected to the second electrode of the first sensing transistor LT1, and the second electrode connected to the third node N3 and to the $q^{th}$ readout line ROLq.

An active layer of each of the first through third sensing transistors LT1 through LT3 may be made of any one of polysilicon, amorphous silicon, and an oxide semiconductor. For example, the active layers of the first sensing transistor LT1 and the third sensing transistor LT3 may be made of polysilicon. The active layer of the second sensing transistor LT2 may be made of an oxide semiconductor. In this case, the first sensing transistor LT1 and the third sensing transistor LT3 may be formed as P-type MOSFETs, and the second sensing transistor LT2 may be formed as an N-type MOSFET.

Figure 5:
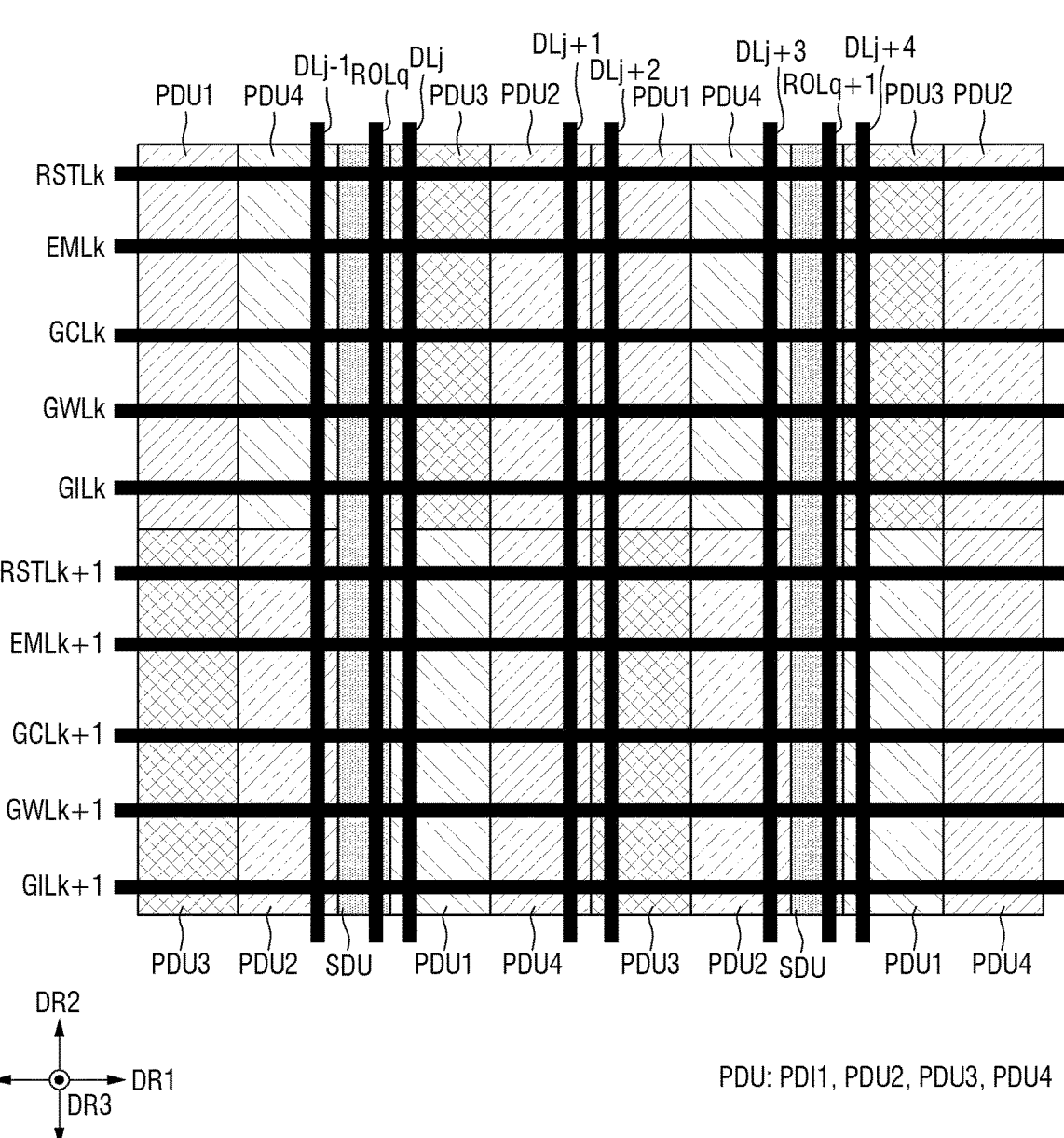
FIG. 5 illustrates pixel drivers, sensing drivers, scan lines, scan initialization lines, scan control lines, emission control lines, reset control lines, data lines, and readout lines according to one or more embodiments.

FIG. 5 illustrates pixel drivers PDU, sensing drivers SDU, scan lines GWLk and GWLk+1, scan initialization lines GILk and GILk+1, scan control lines GCLk and GCLk+1, emission control lines EMLk and EMLk+1, reset control lines RSTLk and RSTLk+1, data lines DLj−1 through DLj+4, and readout lines ROLq and ROLq+1 according to one or more embodiments.

Referring to FIG. 5, the pixel drivers PDU may include a first pixel driver PDU1, a second pixel driver PDU2, a third pixel driver PDU3, and a fourth pixel driver PDU4. The first pixel driver PDU1, the second pixel driver PDU2, the third pixel driver PDU3, and the fourth pixel driver PDU4 may be defined as a unit pixel driver. The unit pixel driver may be defined as including pixel drivers that drive a unit pixel UPX (see FIG. 8), which is a smallest unit of pixels PX for displaying white light.

The first pixel driver PDU1 may supply a driving current to a light-emitting element that emits first light. The first light may be light of a red wavelength band. For example, a main peak wavelength of the first light may be located at about 600 nm to about 750 nm.

The second pixel driver PDU2 may supply a driving current to a light-emitting element that emits second light. The second light may be light of a green wavelength band. For example, a main peak wavelength of the second light may be located at about 480 nm to about 560 nm.

The third pixel driver PDU3 may supply a driving current to a light-emitting element that emits third light. The third light may be light of a blue wavelength band. For example, a main peak wavelength of the third light may be located at about 370 nm to about 460 nm.

The fourth pixel driver PDU4 may supply a driving current to a light-emitting element that emits fourth light. The fourth light may be light of the green wavelength band.

The first pixel driver PDU1, the second pixel driver PDU2, the third pixel driver PDU3, and the fourth pixel driver PDU4 may be located along the first direction DR1 or the second direction DR2. For example, the third pixel driver PDU3 and the second pixel driver PDU2 may neighbor each other along the first direction DR1, and the first pixel driver PDU1 and the fourth pixel driver PDU4 may neighbor each other along the first direction DR1. The first pixel driver PDU1 and the third pixel driver PDU3 may be alternately located along the second direction DR2, and the second pixel driver PDU2 and the fourth pixel driver PDU4 may be alternately located along the second direction DR2.

According to one or more embodiments, in a first row, the third pixel driver PDU3, the second pixel driver PDU2, the first pixel driver PDU1, and the fourth pixel driver PDU4 may be sequentially located along the first direction DR1. In a second row, the first pixel driver PDU1, the fourth pixel driver PDU4, the third pixel driver PDU3, and the second pixel driver PDU2 may be sequentially located along the first direction DR1. In the present specification, the first row is a $(2n-1)^{th}$ row, and the second row is a $(2n)^{th}$ row. However, the present disclosure is not limited thereto, and the first row may also be the $(2n)^{th}$ row, and the second row may also be the $(2n-1)^{th}$ row (where n is a positive integer).

A sensing driver SDU may be located for every two unit pixel drivers. That is, one sensing driver SDU may be located for every eight pixel drivers. For example, one sensing driver SDU may be located between two neighboring unit pixel drivers. In the first row, the first pixel driver PDU1 and the fourth pixel driver PDU4 may be located on a second side (e.g., a left side) of each sensing driver SDU in the first direction DR1, and the third pixel driver PDU3 and the second pixel driver PDU2 may be located on a first side (e.g., a right side) of each sensing driver SDU in the first direction DR1. In the second row, the third pixel driver PDU3 and the second pixel driver PDU2 may be located on the second side (e.g., the left side) of each sensing driver SDU in the first direction DR1, and the first pixel driver PDU1 and the fourth pixel driver PDU4 may be located on the first side (e.g., the right side) of each sensing driver SDU in the first direction DR1.

The sensing drivers SDU may be repeatedly located along the second direction DR2.

The scan lines GWLk and GWLk+1, the scan initialization lines GILk and GILk+1, the scan control lines GCLk and GCLk+1, the emission control lines EMLk and EMLk+1, and the reset control lines RSTLk and RSTLk+1 may extend along the first direction DR1. The data lines DLj−1 through DLj+4 and the readout lines ROLq and ROLq+1 may extend along the second direction DR2.

Each of the sensing drivers SDU may overlap any one of the scan lines GWLk and GWLk+1, any one of the scan initialization lines GILk and GILk+1, any one of the scan control lines GCLk and GCLk+1, any one of the emission control lines EMLk and EMLk+1, any one of the reset control lines RSTLk and RSTLk+1, and any one of the readout lines ROLq and ROLq+1. Each of the first through fourth pixel drivers PDU1 through PDU4 may overlap any one of the scan lines GWLk and GWLk+1, any one of the scan initialization lines GILk and GILk+1, any one of the scan control lines GCLk and GCLk+1, any one of the emission control lines EMLk and EMLk+1, any one of the reset control lines RSTLk and RSTLk+1, and any one of the data lines DLj−1 through DLj+4.

The sensing driver SDU of a photo sensor PS according to one or more embodiments may be located for every two unit pixel drivers. In this case, because the area of the sensing driver SDU can be reduced or minimized, the number of pixels PX per unit area can be increased. Accordingly, the resolution of the display device 1 can be increased.

In addition, one sensing driver SDU may be connected to a plurality of light-sensing portions RA1 through RA4 (see FIG. 8) to sense light received from the light-sensing portions RA1 through RA4. Therefore, the amount of light for reading a change in a sensing current per sensing driver SDU may be increased. Accordingly, the sensing driver SDU may supply an increased sensing current to a readout wiring, thereby increasing sensing accuracy. This will be described in detail with reference to FIG. 8.

Figure 6:
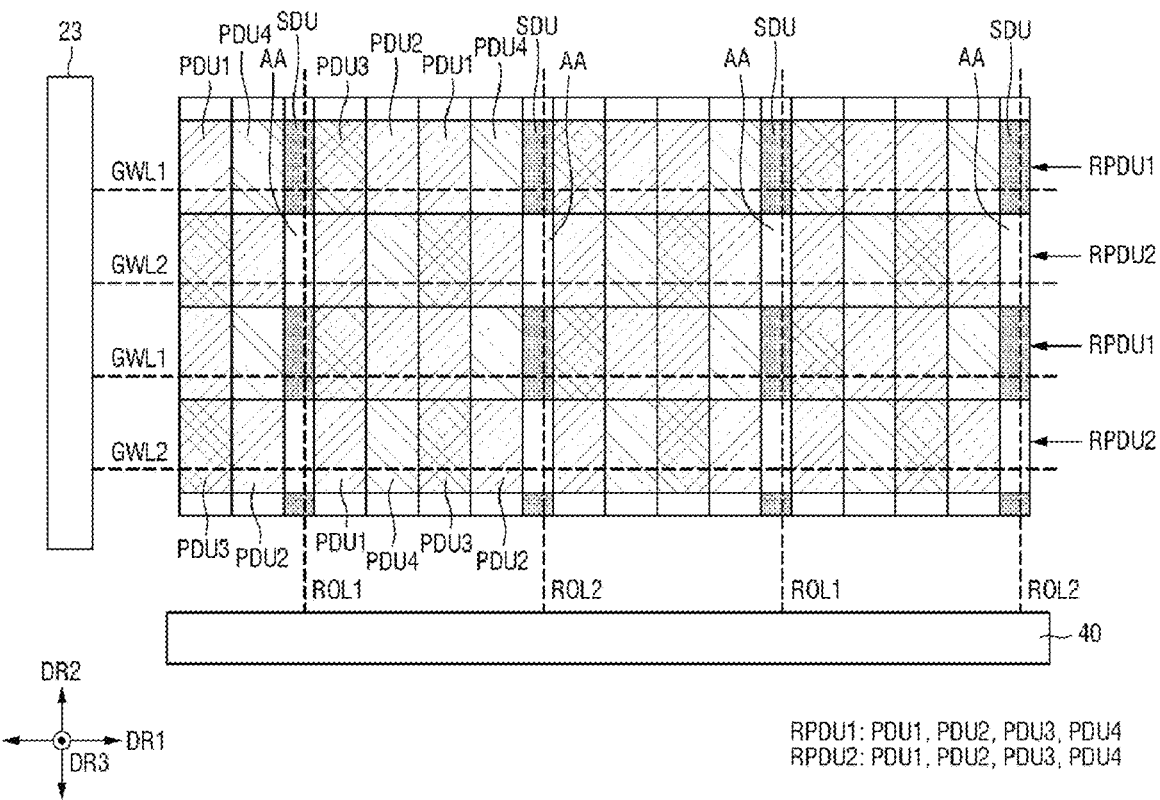
FIG. 6 is a conceptual diagram illustrating the arrangement relationship between the pixel drivers and the sensing drivers according to one or more embodiments.

FIG. 6 is a conceptual diagram illustrating the arrangement relationship between the pixel drivers PDU and the sensing drivers SDU according to one or more embodiments.

FIG. 6 illustrates a sensing driver SDU located for every two unit pixel drivers according to FIG. 5. In this case, because one sensing driver SDU may be connected to one scan line, it may be located only in one of the first row and the second row. In the present specification, a space between pixel drivers at which the sensing driver SDU is not located may be defined as an area AA. Unlike the sensing driver SDU, the area AA may be a space that does not include circuit elements, such as a plurality of sensing transistors.

For example, the sensing driver SDU may be located between first row pixel drivers RPDU1 located in the first row, and the area AA may be located between second row pixel drivers RPDU2 located in the second row.

Each of the first row pixel drivers RPDU1 includes the first pixel driver PDU1, the second pixel driver PDU2, the third pixel driver PDU3, and the fourth pixel driver PDU4 located in the first row, and each of the second row pixel drivers RPDU2 includes the first pixel driver PDU1, the second pixel driver PDU2, the third pixel driver PDU3, and the fourth pixel driver PDU4 located in the second row. The first row pixel drivers RPDU1 and the second row pixel drivers RPDU2 may be alternately arranged along the second direction DR2.

In the currently described one or more embodiments, the sensing drivers SDU are repeatedly located and spaced apart from each other along the first direction DR1 in the first row, but are not located in the second row. The sensing drivers SDU may be repeatedly located and spaced apart from each other along the second direction DR2. The areas AA may be repeatedly arranged along the first direction DR1. The sensing drivers SDU and the areas AA may be alternately arranged along the second direction DR2.

The scan driver 23 may be connected to a first row scan line GWL1 extending along the first direction DR1 in the first row, and may be connected to a second row scan line GWL2 extending along the first direction DR1 in the second row. The first row scan line GWL1 and the second row scan line GWL2 may be alternately located along the second direction DR2.

The readout circuit 40 may be connected to a first column readout line ROL1 extending along the second direction DR2 in a first column, and may be connected to a second column readout line ROL2 extending along the second direction DR2 in a second column. The first column readout line ROL1 and the second column readout line ROL2 may be alternately located along the first direction DR1. In the present specification, the first column is a $(2n-1)^{th}$ column, and the second column is a $(2n)^{th}$ column. However, the present disclosure is not limited thereto, and the first column may also be the $(2n)^{th}$ column, and the second column may also be the $(2n-1)^{th}$ column (where n is a positive integer).

The sensing drivers SDU may be connected to the first row scan line GWL1 to receive a first row scan signal. In other words, the first row scan line GWL1 may transmit the first row scan signal to the first row pixel drivers RPDU1 and the sensing drivers SDU. On the other hand, because the sensing drivers SDU are not located in the second row, the second row scan line GWL2 may transmit a second row scan signal to the second row pixel drivers RPDU2. The areas AA may overlap the second row scan line GWL2.

When the area AA is located between the second row pixel drivers RPDU2, the first row scan line GWL1 may form a parasitic capacitance with a plurality of transistors included in the first row pixel drivers RPDU1, and may form a parasitic capacitance with a plurality of sensing transistors of the sensing drivers SDU. The second row scan line GWL2 may form a parasitic capacitance with a plurality of transistors included in the second row pixel drivers RPDU2. That is, the parasitic capacitance formed by the first row scan line GWL1 may be different from the parasitic capacitance formed by the second row scan line GWL2.

In addition, density per unit area of the first row pixel drivers RPDU1 and the sensing drivers SDU overlapping the first row scan line GWL1 may be greater than density per unit area of the second row pixel drivers RPDU2 overlapping the second row scan line GWL2. Accordingly, the resistance of the first row scan line GWL1 may be different from the resistance of the second row scan line GWL2.

When the sensing drivers SDU overlap the first row scan line GWL1 and do not overlap the second row scan line GWL2, as illustrated in FIG. 6, a resistor-capacitor (RC) delay of the first row scan signal of the first row scan line GWL1 may be different from an RC delay of the second row scan signal of the second row scan line GWL2. Accordingly, the quality of an image displayed by the first row pixel drivers RPDU1 may be different from the quality of an image displayed by the second row pixel drivers RPDU2.

One or more embodiments for reducing or minimizing a difference between the quality of an image displayed by the first row pixel drivers RPDU1 and the quality of an image displayed by the second row pixel drivers RPDU2 will now be described.

Figure 7:
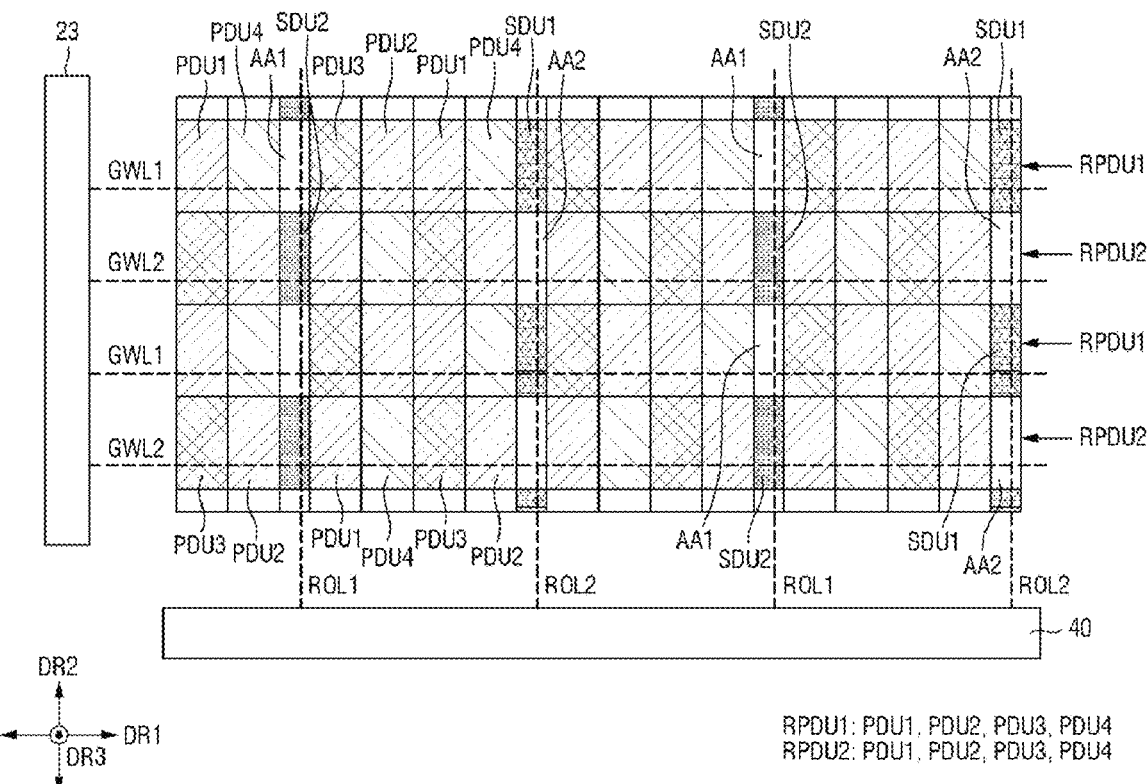
FIG. 7 is a conceptual diagram illustrating the arrangement relationship between pixel drivers and sensing drivers according to one or more embodiments.

FIG. 7 is a conceptual diagram illustrating the arrangement relationship between pixel drivers PDU and sensing drivers SDU according to one or more embodiments.

The one or more embodiments corresponding to FIG. 7 are the same as the one or more embodiments corresponding to FIG. 6 in that a sensing driver SDU is located for every two unit pixel drivers. However, the one or more embodiments corresponding to FIG. 7 are different from the one or more embodiments corresponding to FIG. 6 in that a plurality of sensing drivers include first sensing drivers SDU1 located in a first row and second sensing drivers SDU2 located in a second row, and in that the first sensing drivers SDU1 and the second sensing drivers SDU2 are located in a zigzag pattern along the first direction DR1 and the second direction DR2.

For example, each of the first sensing drivers SDU1 may be located between neighboring first row pixel drivers RPDU1, and each of the second sensing drivers SDU2 may be located between neighboring second row pixel drivers RPDU2. For example, each of the first sensing drivers SDU1 is located between a third pixel driver PDU3 and a fourth pixel driver PDU4 neighboring in the first direction DR1 in the first row, and each of the second sensing drivers SDU2 is located between a first pixel driver PDU1 and a second pixel driver PDU2 neighboring in the first direction DR1 in the second row.

The first sensing drivers SDU1 may be repeatedly located and spaced apart from each other along the first direction DR1, and the second sensing drivers SDU2 may be repeatedly located and spaced apart from each other along the first direction DR1. The first sensing drivers SDU1 and the second sensing drivers SDU2 may not neighbor each other in the first direction DR1 or in the second direction DR2.

At least eight first row pixel drivers RPDU1 may be located between the first sensing drivers SDU1, and at least eight second row pixel drivers RPDU2 may be located between the second sensing drivers SDU2.

The first sensing drivers SDU1 and the second sensing drivers SDU2 may be connected to different scan lines extending in the first direction DR1. For example, the first sensing drivers SDU1 may be connected to first row scan lines GWL1, and the second sensing drivers SDU2 may be connected to second row scan lines GWL2.

In this case, each of the first row scan lines GWL1 may transmit a first row scan signal to the first row pixel drivers RPDU1 and to the first sensing drivers SDU1. Each of the second row scan lines GWL2 may transmit a second row scan signal to the second row pixel drivers RPDU2 and to the second sensing drivers SDU2.

The first sensing drivers SDU1 and the second sensing drivers SDU2 may be connected to different readout lines extending in the second direction DR2. For example, the first sensing drivers SDU1 may be connected to second column readout lines ROL2, and the second sensing drivers SDU2 may be connected to first column readout lines ROL1.

According to the currently described one or more embodiments, the first sensing drivers SDU1 overlapping the first row scan lines GWL1, and the second sensing drivers SDU2 overlapping the second row scan lines GWL2, are located in a zigzag pattern in the second direction DR2. Therefore, a difference between the first row scan signal and the second row scan signal can be reduced or minimized.

Because the first sensing drivers SDU1 and the second sensing drivers SDU2 are located in a zigzag pattern, the number of the first sensing drivers SDU1 may be the same as the number of the second sensing drivers SDU2. Therefore, density per unit area of the first row pixel drivers RPDU1 and the first sensing drivers SDU1 overlapping each first row scan line GWL1 may be substantially the same as density per unit area of the second row pixel drivers RPDU2 and the second sensing drivers SDU2 overlapping each second row scan line GWL2.

Accordingly, a difference between parasitic capacitance formed by each first row scan line GWL1 and parasitic capacitance formed by each second row scan line GWL2 may be reduced or minimized, and a difference between line resistance of each first row scan line GWL1 and line resistance of each second row scan line GWL2 may be reduced or minimized. Therefore, a difference between an RC delay of the first row scan signal transmitted to the first row pixel drivers RPDU1 and an RC delay of the second row scan signal transmitted to the second row pixel drivers RPDU2 may be reduced or minimized. A difference between the quality of an image displayed by the first row pixel drivers RPDU1 and the quality of an image displayed by the second row pixel drivers RPDU2 may be reduced or minimized. That is, a display panel 10 may display an image of uniform quality in the repeated first and second rows.

In the present specification, each area located between neighboring first row pixel drivers RPDU1 and located alternately with each first sensing driver SDU1 in the first direction DR1 is referred to as a first area AA1. In addition, each area located between neighboring second row pixel drivers RPDU2 and located alternately with each second sensing driver SDU2 in the first direction DR1 is defined as a second area AA2. Each of the first and second areas AA1 and AA2 may be a space that does not include circuit elements, such as a plurality of sensing transistors.

The first sensing drivers SDU1 and the second areas AA2 may be alternately located in the second direction DR2, and the second sensing drivers SDU2 and the first areas AA1 may be alternately located in the second direction DR2.

The first areas AA1 may overlap the first row scan lines GWL1, but may not be connected to the first row scan lines GWL1. The second areas AA2 may overlap the second row scan lines GWL2, but may not be connected to the second row scan lines GWL2.

According to the currently described one or more embodiments, because the first areas AA1 and the second sensing drivers SDU2 are alternately located along the second direction DR2, and because the second areas AA2 and the first sensing drivers SDU1 are alternately located along the second direction DR2, a difference between the first scan signal of the first row scan lines GWL1 and the second row scan signal of the second row scan lines GWL2 can be reduced or minimized.

FIG. 8 is a layout view illustrating pixels PX and photo sensors PS in a display area of the display panel 10 according to FIG. 7.

FIG. 8 illustrates two first row pixel drivers RPDU1 (see FIG. 7), two second row pixel drivers RPDU2 (see FIG. 7), two first sensing drivers SDU1, and two second sensing drivers SDU2 in FIG. 7.

The display area may include first pixels PX1, second pixels PX2, third pixels PX3, and fourth pixels PX4. The pixels PX may be divided into the first pixels PX1, the second pixels PX2, the third pixels PX3, and the fourth pixels PX4.

Each unit pixel UPX may include a first pixel PX1, a second pixel PX2, a third pixel PX3, and a fourth pixel PX4. The first pixel PX1, the second pixel PX2, the third pixel PX3, and the fourth pixel PX4 may be defined as a unit pixel UPX. The unit pixel UPX may be defined as a smallest unit of pixels that can display white light.

The first pixel PX1 may include a first light-emitting portion EA1 for emitting first light, a first pixel driver PDU1, and a first pixel electrode 171 located for the first light-emitting portion EA1.

The second pixel PX2 may include a second light-emitting portion EA2 for emitting second light, a second pixel driver PDU2, and a second pixel electrode 172 located for the second light-emitting portion EA2.

The third pixel PX3 may include a third light-emitting portion EA3 for emitting third light, a third pixel driver PDU3, and a third pixel electrode 173 located for the third light-emitting portion EA3.

The fourth pixel PX4 may include a fourth light-emitting portion EA4 for emitting second light, a fourth pixel driver PDU4, and a fourth pixel electrode 174 located for the fourth light-emitting portion EA4.

The arrangement relationship between the first pixel driver PDU1, the second pixel driver PDU2, the third pixel driver PDU3, and the fourth pixel driver PDU4 and the arrangement relationship between the first and second sensing drivers SDU1 and SDU2 and first and second areas AA1 and AA2 have been described above with reference to FIGS. 5 and 7, and thus will not be described again here.

Each of the first light-emitting portion EA1, the second light-emitting portion EA2, the third light-emitting portion EA3, and the fourth light-emitting portion EA4 may overlap at least two pixel drivers. For example, the first light-emitting portion EA1 may overlap the first pixel driver PDU1 and the fourth pixel driver PDU4. Also, the third light-emitting portion EA3 may overlap the second pixel driver PDU2 and the third pixel driver PDU3. Each of the second light-emitting portion EA2 and the fourth light-emitting portion EA4 may overlap the first through fourth pixel drivers PDU1 through PDU4, any one of (e.g., a corresponding one of) the first and second sensing drivers SDU1 and SDU2, and any one of (e.g., a corresponding one of) the first and second areas AA1 and AA2.

The first light-emitting portion EA, the second light-emitting portion EA2, the third light-emitting portion EA3, and the fourth light-emitting portion EA4 may have an octagonal planar shape. However, the present disclosure is not limited thereto. The first light-emitting portion EA1, the second light-emitting portion EA2, the third light-emitting portion EA3, and the fourth light-emitting portion EA4 may also have a quadrilateral planar shape, such as a rhombus or a polygonal planar shape other than a quadrilateral and an octagon.

Each photo sensor PS may include a plurality of light-sensing portions RA1 through RA4 spaced apart from the first through fourth light-emitting portions EA1 through EA4, one sensing driver electrically connected to the light-sensing portions RA1 through RA4, and a sensing electrode 180 located for the light-sensing portions RA1 through RA4. The photo sensors PS may be divided into a first photo sensor PS1 including a first sensing driver SDU1, and a second photo sensor PS2 including a second sensing driver SDU2. In addition, the photo sensors PS further include a first area AA1 repeated with the first sensing driver SDU1 in the first direction DR1, and a second area AA2 repeated with the second sensing driver SDU2 in the first direction DR1. The first photo sensor PS1 includes a plurality of light-sensing portions RA1 through RA4, a first sensing driver SDU1, a second area AA2, and a first sensing electrode 181. The second photo sensors PS2 includes a plurality of light-sensing portions RA1 through RA4, a second sensing driver SDU2, a first area AA1, and a second sensing electrode 182. In the drawing, for the sake of convenience, a third light-sensing portion and a fourth light-sensing portion of the first photo sensor PS1 are not illustrated. Each of the first photo sensor PS1 and the second photo sensor PS2 may be repeatedly located along the second direction DR2.

Each of the light-sensing portions RA1 through RA4 may be located between the first light-emitting portion EA1 and the third light-emitting portion EA3 neighboring in the first direction DR1, and may be located between the second light-emitting portion EA2 and the fourth light-emitting portion EA4 neighboring in the second direction DR2.

The light-sensing portions RA1 through RA4 include a first light-sensing portion RA1, a second light-sensing portion RA2, a third light-sensing portion RA3, and a fourth light-sensing portion RA4. The first light-sensing portion RA1 may overlap the first sensing driver SDU1 or the second sensing driver SDU2. The second light-sensing portion RA2 may overlap the first area AA1 or the second area AA2. Each of the third light-sensing portion RA3 and the fourth light-sensing portion RA4 may overlap at least two pixel drivers. For example, the third light-sensing portion RA3 may overlap the fourth pixel driver PDU4 and the third pixel driver PDU3, and the fourth light-sensing portion RA4 may overlap the second pixel driver PDU2 and the first pixel driver PDU1.

The sensing electrode 180 may be located for each of the light-sensing portions RA1 through RA4. The first sensing electrode 181 may be located for the light-sensing portions RA1 through RA4 included in first photo sensor PS1, and may be connected to the first sensing driver SDU1. The second sensing electrode 182 may be located for the light-sensing portions RA1 through RA4 included in second photo sensor PS2, and may be connected to the second sensing driver SDU2.

The sensing electrode 180 may include first through third connection portions 180a through 180c. The first through third connection portions 180a through 180c may connect the light-sensing portions RA1 through RA4 spaced apart from each other. The first through third connection portions 180a through 180c may respectively overlap the first through fourth pixel drivers PDU1 through PDU4 located in a first row or a second row. The first through third connection portions 180a through 180c may be respectively located between the first through fourth light-emitting portions EA1 through EA4 located in the first row or the second row.

The first connection portion 180a and the second connection portion 180b may connect light-sensing portions neighboring in the first direction DR1 or the second direction DR2. For example, the first connection portion 180a connects the second light-sensing portion RA2 and the fourth light-sensing portion RA4, and the second connection portion 180b connects the first light-sensing portion RA1 and the third light-sensing portion RA3. In addition, the third connection portion 180c may connect the first connection portion 180a and the second connection portion 180b.

Accordingly, the light-sensing portions RA1 through RA4 spaced apart from each other may be connected to one first sensing driver SDU1 to supply a sensing current to one second column readout line ROL2 (see FIG. 7). In addition, the light-sensing portions RA1 through RA4 spaced apart from each other may be connected to one second sensing driver SDU2 to supply a sensing current to one first column readout line ROL1 (see FIG. 7).

According to the currently described one or more embodiments, one first sensing driver SDU1 or one second sensing driver SDU2 may sense light received from a plurality of light-sensing portions RA1 through RA4. Accordingly, the amount of external light that can be received by the first sensing driver SDU1 or the second sensing driver SDU2 may increase. Accordingly, a change in a sensing current that can be generated by the first sensing driver SDU1 or the second sensing driver SDU2 may increase, and the sensing accuracy of a photo sensor PS may be increased by the increased sensing current.

Figure 9:
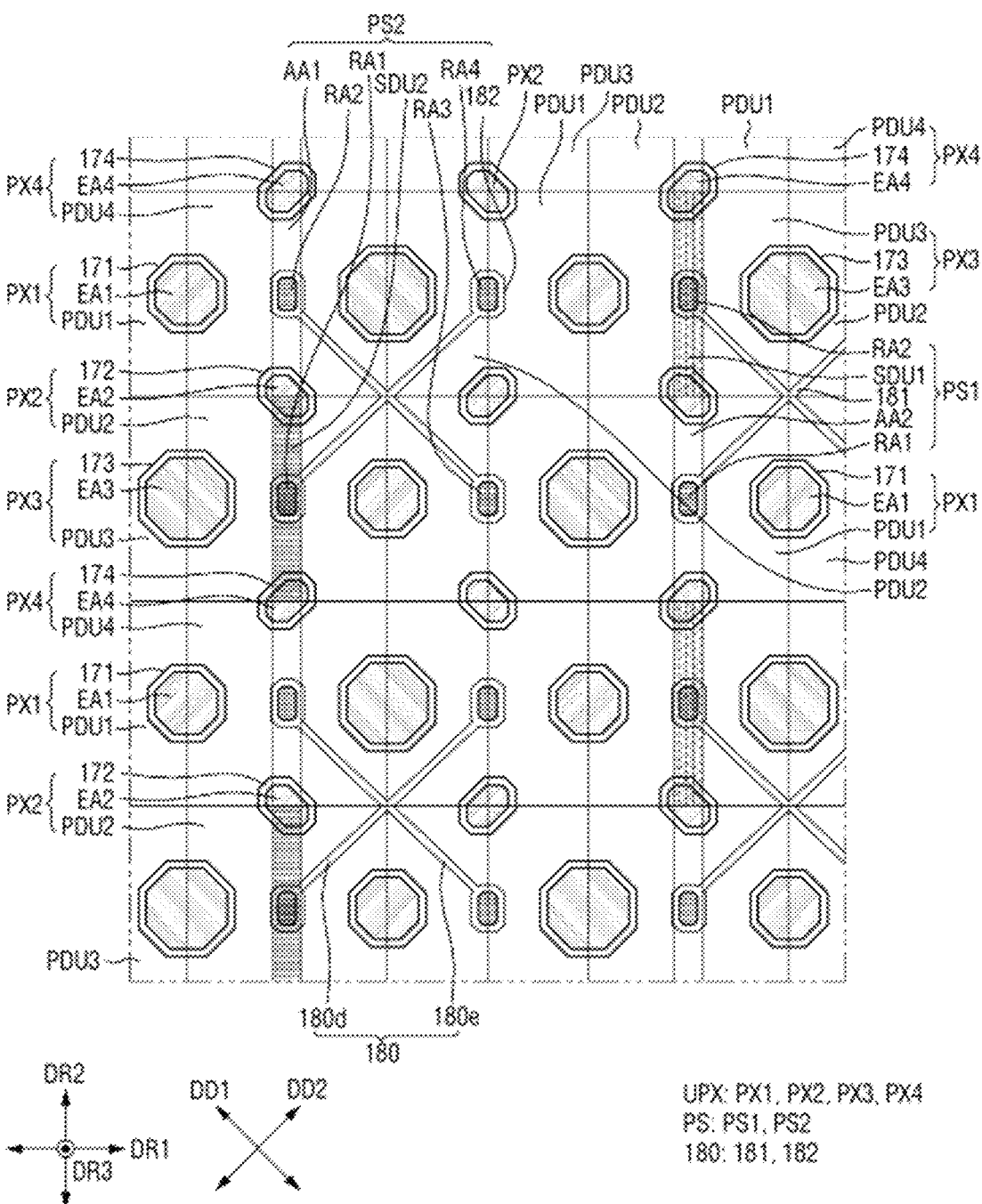
FIG. 9 is a layout view illustrating pixels and photo sensors in a display area of a display panel according to one or more embodiments.

FIG. 9 is a layout view illustrating pixels and photo sensors in a display area of a display panel according to one or more embodiments.

One or more embodiments may be different from the one or more embodiments corresponding to FIG. 8 in that a sensing electrode 180 does not include a first connection portion 180a, a second connection portion 180b, and a third connection portion 180c, but instead includes a fourth connection portion 180d and a fifth connection portion 180e. The currently described embodiments are the same as previously described embodiments in that the fourth connection portion 180d and the fifth connection portion 180e connect a plurality of light-sensing portions RA1 through RA4 spaced apart from each other. In addition, the fourth connection portion 180d and the fifth connection portion 180e may respectively overlap first through fourth pixel drivers PDU1 through PDU4 located in a first row or a second row. The fourth connection portion 180d and the fifth connection portion 180e may be respectively located between first through fourth light-emitting portions EA1 through EA4 located in the first row or the second row.

Each of the fourth connection portion 180d and the fifth connection portion 180e may connect respective light-sensing portions neighboring each other in a diagonal direction. A first diagonal direction DD1 may be a direction inclined by 45 degrees between the first direction DR1 and the second direction DR2, and a second diagonal direction DD2 may be a direction orthogonal to the first diagonal direction DD1. The fourth connection portion 180d may connect a second light-sensing portion RA2 and a fourth light-sensing portion RA4 neighboring each other in the first diagonal direction DD1, and the fifth connection portion 180e may connect a first light-sensing portion RA1 and a third light-sensing portion RA3 neighboring each other in the second diagonal direction DD2.

FIGS. 10 and 11 are detailed layout views of area A of FIG. 8. FIG. 10 is a layout view illustrating a first active layer, a first gate layer, a second gate layer, a second active layer, a third gate metal layer, and a first data layer of a third pixel driver PDU3 and a first area AA1. FIG. 11 is a layout view further illustrating a second data layer and a light-emitting element layer.

Referring to FIGS. 10 and 11, the third pixel driver PDU3 may include a driving transistor DT, first through sixth transistors T1 through T6, a first capacitor Cst, connection electrodes BE1 through BE6, and a first anode connection electrode ANDE1.

A first row reset control line RSTL1, a first row emission control line EML1, a first row scan line GWL1, a first row scan control line GCL1, and a first row scan initialization line GIL1 located in a first row may extend in the first direction DR1. A j'h data line DLj, a driving voltage line VDL, and a second reset voltage line VRL2 may extend in the second direction DR2. A first column readout line ROL1 located in a first column may extend in the second direction DR2.

The arrangement relationship of the third pixel driver PDU3 will be described.

The driving transistor DT may include a channel layer DTA, a gate electrode DTG, a first electrode DTS, and a second electrode DTD. The channel layer DTA of the driving transistor DT may overlap the gate electrode DTG of the driving transistor DT. The gate electrode DTG of the driving transistor DT may be located on the channel layer DTA of the driving transistor DT.

The gate electrode DTG of the driving transistor DT may be connected to a first connection electrode BE1 through a first contact hole CNT1. The first connection electrode BE1 may be connected to a second electrode D2 of the second transistor T2 through a second contact hole CNT2. The first connection electrode BE1 may cross the first row scan control line GCL1.

The first electrode DTS of the driving transistor DT may be connected to a first electrode S1 of the first transistor T1 and a second electrode D4 of the fourth transistor T4.

The second electrode DTD of the driving transistor DT may be connected to a second connection electrode BE2 through a third contact hole CNT3. The second connection electrode BE2 may be connected to the second electrode D2 of the second transistor T2 through a fourth contact hole CNT4.

In addition, a region of the gate electrode DTG of the driving transistor DT, which overlaps a second capacitor electrode CE12, may correspond to a first capacitor electrode CE11 of the first capacitor Cst.

The first transistor T1 may be connected to a channel layer A1, a gate electrode G1, the first electrode S1, and a second electrode D1. The channel layer A1 of the first transistor T1 may overlap the gate electrode G1 of the first transistor T1. The gate electrode G1 of the first transistor T1 may be located on the channel layer A1 of the first transistor T1. The gate electrode G1 of the first transistor T1 may be a portion of the first row scan line GWL1.

The first electrode S1 of the first transistor T1 may be connected to a third connection electrode BE3 through a fifth contact hole CNT5. The third connection electrode BE3 may be connected to the j'h data line DLj through a sixth contact hole CNT6. The second electrode D1 of the first transistor T1 may be connected to the first electrode DTS of the driving transistor DT and the second electrode D4 of the fourth transistor T4.

The second transistor T2 may be connected to a channel layer A2, a gate electrode G2, a first electrode S2, and the second electrode D2. The channel layer A2 of the second transistor T2 may overlap the gate electrode G2 of the second transistor T2. The gate electrode G2 of the second transistor T2 may be located on the channel layer A2 of the second transistor T2. The gate electrode G2 of the second transistor T2 may be a portion of the first row scan control line GCL1.

The first electrode S2 of the second transistor T2 may be connected to a second electrode D3 of the third transistor T3. In addition, the second electrode D2 of the second transistor T2 may be connected to the second connection electrode BE2 through the fourth contact hole CNT4. The second electrode D2 of the second transistor T2 may be connected to the first connection electrode BE1 through the second contact hole CNT2.

The third transistor T3 may be connected to a channel layer A3, a gate electrode G3, a first electrode S3, and the second electrode D3. The channel layer A3 of the third transistor T3 may overlap the gate electrode G3 of the third transistor T3. The gate electrode G3 of the third transistor T3 may be located on the channel layer A3 of the third transistor T3. The gate electrode G3 of the third transistor T3 may be a portion of the first row scan initialization line GIL1.

The first electrode S3 of the third transistor T3 may be connected to a fourth connection electrode BE4 through a seventh contact hole CNT7. The fourth connection electrode BE4 may be connected to a first initialization voltage line VIL1 through an eighth contact hole CNT8. The second electrode D3 of the third transistor T3 may be connected to the second electrode D2 of the second transistor T2.

The fourth transistor T4 may be connected to a channel layer A4, a gate electrode G4, a first electrode S4, and the second electrode D4. The channel layer A4 of the fourth transistor T4 may overlap the gate electrode G4 of the fourth transistor T4. The gate electrode G4 of the fourth transistor T4 may be located on the channel layer A4 of the fourth transistor T4. The gate electrode G4 of the fourth transistor T4 may be a portion of the first row emission control line EML1.

The first electrode S4 of the fourth transistor T4 may be connected to a sixth connection electrode BE6 through a ninth contact hole CNT9. The sixth connection electrode BE6 may be connected to the driving voltage line VDL through a fourteenth contact hole CNT14. The second electrode D4 of the fourth transistor T4 may be connected to the first electrode DTS of the driving transistor DT and the first electrode S1 of the first transistor T1.

The fifth transistor T5 may be connected to a channel layer A5, a gate electrode G5, a first electrode S5, and a second electrode D5. The channel layer A5 of the fifth transistor T5 may overlap the gate electrode G5 of the fifth transistor T5. The gate electrode G5 of the fifth transistor T5 may be located on the channel layer A5 of the fifth transistor T5. The gate electrode G5 of the fifth transistor T5 may be a portion of the first row emission control line EML1.

The first electrode S5 of the fifth transistor T5 may be connected to the second connection electrode BE2 through the third contact hole CNT3. The second electrode D5 of the fifth transistor T5 may be connected to a fifth connection electrode BE5 through an eleventh contact hole CNT11. The fifth connection electrode BE5 may be connected to the first anode connection electrode ANDE1 through a twelfth contact hole CNT12. A first electrode of a light-emitting element EL may be connected to the first anode connection electrode ANDE1 through a first anode contact hole CNTA1.

The sixth transistor T6 may be connected to a channel layer A6, a gate electrode G6, a first electrode S6, and a second electrode D6. The channel layer A6 of the sixth transistor T6 may overlap the gate electrode G6 of the sixth transistor T6. The gate electrode G6 of the sixth transistor T6 may be located on the channel layer A6 of the sixth transistor T6. The gate electrode G6 of the sixth transistor T6 may be a portion of the first row scan line GWL1.

The first electrode S6 of the sixth transistor T6 may be connected to a second initialization voltage line VIL2 through a thirteenth contact hole CNT13. The first electrode S6 of the sixth transistor T6 may overlap the first row scan initialization line GIL1. The second electrode D6 of the sixth transistor T6 may be connected to the second initialization voltage line VIL2 through the thirteenth contact hole CNT13.

The first capacitor Cst may include the first capacitor electrode CE11 and the second capacitor electrode CE12. The first capacitor electrode CE11 is a portion of the gate electrode DTG of the driving transistor DT. The second capacitor electrode CE12 may be connected to the sixth connection electrode BE6 through a tenth contact hole CNT10.

The first area AA1 may overlap the first row reset control line RSTL1, the first row light emission control line EML1, the first row scan line GWL1, the first row scan control line GCL1, and the first row scan initialization line GIL1 extending in the first direction DR1 and may overlap the second reset voltage line VRL2 and a first column readout line ROL1 extending in the second direction DR2. The first area AA1 may be a space that does not include circuit elements, such as a plurality of sensing transistors.

The light-emitting element layer of FIG. 11 includes a second pixel electrode 172, a third pixel electrode 173, a fourth pixel electrode 174, a second light-emitting portion EA2, a third light-emitting portion EA3, a fourth light-emitting portion EA4, a second sensing electrode 182, and a second light-sensing portion RA2.

The third light-emitting portion EA3 may be defined by the third pixel electrode 173 and a bank BK (e.g., see FIG. 14). The area of the third pixel electrode 173 may be larger than the area of the third light-emitting portion EA3. The third pixel electrode 173 may be connected to the third pixel driver PDU3 through the first anode contact hole CNTA1.

The second light-emitting portion EA2 may be defined by the second pixel electrode 172 and the bank BK. The fourth light-emitting portion EA4 may be defined by the fourth pixel electrode 174 and the bank BK.

The second light-sensing portion RA2 may be defined by the second sensing electrode 182 and the bank BK. The area of the second sensing electrode 182 may be larger than the area of the second light-sensing portion RA2. The second sensing electrode 182 may be connected to a second sensing driver SDU2 through a second anode contact hole CNTA2 (see FIG. 13). The second light-sensing portion RA2 may be spaced apart from the second anode contact hole CNTA2.

FIGS. 12 and 13 are detailed layout views of area B of FIG. 8. FIG. 12 is a layout view illustrating a first active layer, a first gate layer, a second gate layer, a second active layer, a third gate metal layer and a first data layer of a first pixel driver PDU1 and a second sensing driver SDU2. FIG. 13 is a layout view further illustrating a second data layer and a light-emitting element layer.

The arrangement relationship of the first pixel driver PDU1 is substantially the same as the arrangement relationship of the third pixel driver PDU3 described above, and thus will not be described again here. In FIGS. 12 and 13, the first pixel driver PDU1 and the second sensing driver SDU2 are connected to a second row reset control line RSTL2, a second row emission control line EML2, a second row scan line GWL2, a second row scan control line GCL2 and a second row scan initialization line GIL2 located in a second row, and are connected to a $j^{th}$ data line DLj and a driving voltage line VDL.

The second sensing driver SDU2 may include first through third sensing transistors LT1 through LT3, sensing connection electrodes LBE1 and LBE2, and a second anode connection electrode ANDE2. The second sensing driver SDU2 is connected to a second reset voltage line VRL2 and a first column readout line ROL1.

The first sensing transistor LT1 may be connected to a channel layer LA1, a gate electrode LG1, a first electrode LS1, and a second electrode LD1. The channel layer LA1 of the first sensing transistor LT1 may overlap the gate electrode LG1 of the first sensing transistor LT1. The gate electrode LG1 of the first sensing transistor LT1 may be located on the channel layer LA1 of the first sensing transistor LT1.

The gate electrode LG1 of the first sensing transistor LT1 may be connected to a first sensing connection electrode LBE1 through a first sensing contact hole LCT1. The first sensing connection electrode LBE1 may be connected to a first electrode LS2 of the second sensing transistor LT2 through a second sensing contact hole LCT2. The first sensing connection electrode LBE1 may be connected to the second anode connection electrode ANDE2 through a fifth sensing contact hole LCT5.

The first electrode LS1 of the first sensing transistor LT1 may be connected to a second initialization voltage line VIL2 through a seventh sensing contact hole LCT7. The first electrode LS1 of the first sensing transistor LT1 may extend in the second direction DR2.

The second electrode LD1 of the first sensing transistor LT1 may be connected to a first electrode LS3 of the third sensing transistor LT3.

The second sensing transistor LT2 may be connected to a channel layer LA2, a gate electrode LG2, the first electrode LS2, and a second electrode LD2. The channel layer LA2 of the second sensing transistor LT2 may overlap the gate electrode LG2 of the second sensing transistor LT2. The gate electrode LG2 of the second sensing transistor LT2 may be located on the channel layer LA2 of the second sensing transistor LT2. The gate electrode LG2 of the second sensing transistor LT2 may be a portion of the second row reset control line RSTL2.

The first electrode LS2 of the second sensing transistor LT2 may be connected to a first reset voltage line VRL1 through a third sensing contact hole LCT3. The first reset voltage line VRL1 may be connected to the second reset voltage line VRL2 through an eighth sensing contact hole LCT8. The second electrode LD2 of the second sensing transistor LT2 may be connected to the first sensing connection electrode LBE1 through the second sensing contact hole LCT2.

The third sensing transistor LT3 may be connected to a channel layer LA3, a gate electrode LG3, the first electrode LS3, and a second electrode LD3. The channel layer LA3 of the third sensing transistor LT3 may overlap the gate electrode LG3 of the third sensing transistor LT3. The gate electrode LG3 of the third sensing transistor LT3 may be located on the channel layer LA3 of the third sensing transistor LT3. The gate electrode LG3 of the third sensing transistor LT3 may be a portion of the second row scan line GWL2.

The first electrode LS3 of the third sensing transistor LT3 may be connected to the second electrode LD1 of the first sensing transistor LT1. The second electrode LD3 of the third sensing transistor LT3 may be connected to a second sensing connection electrode LBE2 through a fourth sensing contact hole LCT4. The second sensing connection electrode LBE2 may be connected to the first column readout line ROL1 through a sixth sensing contact hole LCT6.

The light-emitting element layer of FIG. 13 includes a first pixel electrode 171, a second pixel electrode 172, a fourth pixel electrode 174, a first light-emitting portion EA1, a second light-emitting portion EA2, a fourth light-emitting portion EA4, a second sensing electrode 182, and a first light-sensing portion RA1.

The first light-emitting portion EA1 may be defined by the first pixel electrode 171 and the bank BK. The area of the first pixel electrode 171 may be larger than the area of the first light-emitting portion EA1. The first pixel electrode 171 may be connected to the first pixel driver PDU1 through a first anode contact hole CNTA1.

The first light-sensing portion RA1 may be defined by the second sensing electrode 182 and the bank BK. The area of the second sensing electrode 182 may be larger than the area of the first light-sensing portion RA1. The second sensing electrode 182 may be connected to a second sensing driver SDU2 through a second anode contact hole CNTA2. The first light-sensing portion RA1 may be adjacent to the second anode contact hole CNTA2 and may overlap the second anode connection electrode ANDE2 in the thickness direction of a substrate SUB.

A second pixel driver PDU2, a fourth pixel driver PDU4, a first sensing driver SDU1, and a second area AA2 are respectively substantially the same as the first pixel driver PDU1, the third pixel driver PDU3, the second sensing driver SDU2, and the first area AA1 described above with reference to FIGS. 10 through 13 and thus will not be described again here.

FIG. 14 is an example of a cross-sectional view taken along the line A-A' of FIGS. 10 and 11. FIG. 15 is an example of a cross-sectional view taken along the line B-B' of FIGS. 10 and 11. FIG. 16 is an example of a cross-sectional view taken along the line C-C' of FIGS. 12 and 13.

Referring to FIGS. 14 through 16, a thin-film transistor layer, a light-emitting element layer, and an encapsulation layer TFE may be sequentially formed on the substrate SUB.

The thin-film transistor layer may be a layer in which the driving transistor DT, the first through sixth transistors T1 through T6, and the first capacitor Cst of each of the pixel drivers PDU1 through PDU4 and the first through third sensing transistors LT1 through LT3 of the sensing drivers SDU1 and SDU2 are formed. The thin-film transistor layer TFTL may include a first active layer ACT1, a second active layer ACT2, a first gate metal layer GTL1, a second gate metal layer GTL2, a third gate metal layer GTL3, a first data metal layer DTL1, a second data metal layer DTL2, a buffer layer BF, a first gate-insulating layer 131, a first interlayer-insulating layer 141, a second interlayer-insulating layer 142, a second gate-insulating layer 132, a third interlayer-insulating layer 143, a first organic layer 160, and a second organic layer 161.

The buffer layer BF may be located on a surface of the substrate SUB. The buffer layer BF may be a multilayer in which one or more inorganic layers selected from a silicon nitride layer, a silicon oxynitride layer, a silicon oxide layer, a titanium oxide layer, and an aluminum oxide layer are alternately stacked.

The first active layer ACT1 may be located on the buffer layer BF. The first active layer ACT1 may include a silicon semiconductor, such as polycrystalline silicon, monocrystalline silicon, low-temperature polycrystalline silicon, or amorphous silicon.

The first active layer ACT1 may include the channel layer DTA, the first electrode DTS, and the second electrode DTD of the driving transistor DT. The channel layer DTA of the driving transistor DT may be a region overlapping the gate electrode DTG of the driving transistor DT in the third direction DR3, which is the thickness direction of the substrate SUB. In addition, the first active layer ACT1 may further include the channel layers A1 and A4 through A6, the first electrodes S1 and S4 through S6, and the second electrodes D1 and D4 through D6 of the first and fourth through sixth transistors T1 and T4 through T6.

The first gate-insulating layer 131 may be located on the first active layer ACT1. The first gate-insulating layer 131 may be made of an inorganic layer, for example, a silicon nitride layer, a silicon oxynitride layer, a silicon oxide layer, a titanium oxide layer, or an aluminum oxide layer.

The first gate metal layer GTL1 may be located on the first gate-insulating layer 131. The first gate metal layer GTL1 may include the gate electrode DTG of the driving transistor DT. In addition, the first gate metal layer GTL1 may include the gate electrodes G1 and G4 through G6 of the first and fourth through sixth transistors T1 and T4 through T6 and the gate electrodes LG1 and LG3 of the first and third sensing transistors LT1 and LT3. In addition, the first gate metal layer GTL1 may further include the first capacitor electrode CE11, the $k^{th}$ scan line GWLk, and the $k^{th}$ emission control line EMLk. The first gate metal layer GTL1 may be a single layer, or may be a multilayer made of any one or more selected from molybdenum (Mo), aluminum (Al), chromium (Cr), gold (Au), titanium (Ti), nickel (Ni), neodymium (Nd), copper (Cu), and alloys thereof.

The first interlayer-insulating layer 141 may be located on the first gate metal layer GTL1. The first interlayer-insulating layer 141 may be made of an inorganic layer, for example, a silicon nitride layer, a silicon oxynitride layer, a silicon oxide layer, a titanium oxide layer, or an aluminum oxide layer.

The second gate metal layer GTL2 may be located on the first interlayer-insulating layer 141. The second gate metal layer GTL2 may include the second capacitor electrode CE12, first through third light-blocking layers BML1 through BML3, and the first initialization voltage line VIL1. The first through third light-blocking layers BML1 through BML3 may inhibit light incident from under the display panel 10 from entering the second semiconductor layer ACT2 located on the light-blocking layers BML1 through BML3. The second gate metal layer GTL2 may include the same material as the first gate metal layer GTL1 described above.

The second interlayer-insulating layer 142 may be located on the second gate metal layer GTL2. The second interlayer-insulating layer 142 may include the same material as the first interlayer-insulating layer 141 described above.

The second active layer ACT2 may be located on the second interlayer-insulating layer 142. The second active layer ACT2 may include an oxide semiconductor, such as IGZO (indium (In), gallium (Ga), zinc (Zn) and oxygen (O)), IGZTO (indium (In), gallium (Ga), zinc (Zn), tin (Sn) and oxygen (O)), or IGTO (indium (In), gallium (Ga), tin (Sn) and oxygen (O)).

The second active layer ACT2 may include the channel layers A2 and A3, the first electrodes S2 and S3, and the second electrodes D2 and D3 of the second and third transistors T2 and T3. The channel layers A2 and A3 of the second and third transistors T2 and T3 may overlap the gate electrodes G2 and G3 in the third direction DR3, respectively. In addition, the second active layer ACT2 may include the channel layer LA2, the first electrode LS2, and the second electrode LD2 of the second sensing transistor LT2. The channel layer LA2 of the second sensing transistor LT2 may overlap the gate electrode LG2 in the third direction DR3.

The second gate-insulating layer 132 may be located on the second active layer ACT2. The second gate-insulating layer 132 may include the same material as the first gate-insulating layer 131 described above.

The third gate metal layer GTL3 may be located on the second gate-insulating layer 132. The third gate metal layer GTL3 may include the gate electrodes G2 and G3 of the second and third transistors T2 and T3 and the gate electrodes LG2 and LG3 of the second and third sensing transistors LT2 and LT3, the $k^{th}$ scan initialization line GILk, the $k^{th}$ scan control line GCLk, and the $k^{th}$ reset control line RSTLk. The third gate metal layer GTL3 may include the same material as the first gate metal layer GTL1 described above.

The third interlayer-insulating layer 143 may be located on the third gate metal layer GTL3. The third interlayer-insulating layer 143 may include the same material as the first interlayer-insulating layer 141 described above.

The first data metal layer DTL1 may be formed on the third interlayer-insulating layer 143. The first data metal layer DTL1 may include the second initialization voltage line VIL2, the first reset voltage line VRL1, the first through sixth connection electrodes BE1 through BE6, and the first and second sensing connection electrodes LBE1 and LBE2. The first data metal layer DTL1 may be a single layer or a multilayer made of any one or more selected from molybdenum (Mo), aluminum (Al), chromium (Cr), gold (Au), titanium (Ti), nickel (Ni), neodymium (Nd), copper (Cu), and alloys thereof.

The first organic layer 160 may be formed on the first data metal layer DTL1 to flatten steps formed by the first active layer ACT1, the second active layer ACT2, the first gate metal layer GTL1, the second gate metal layer GTL2, the third gate metal layer GTL3, and the first data metal layer DTL1. The first organic layer 160 may be made of an organic layer, such as acryl resin, epoxy resin, phenolic resin, polyamide resin, or polyimide resin.

The second data metal layer DTL2 may be formed on the first organic layer 160. The second data metal layer DTL2 may include the first anode connection electrode ANDE1, the second anode connection electrode ANDE2, the driving voltage line VDL, the second reset voltage line VRL2, the $j^{th}$ data line DLj, and the $q^{th}$ readout line ROLq. The second data metal layer DTL2 may be a single layer, or may be a multilayer made of any one or more selected from molybdenum (Mo), aluminum (Al), chromium (Cr), gold (Au), titanium (Ti), nickel (Ni), neodymium (Nd), copper (Cu), and alloys thereof.

The second organic layer 161 may be formed on the second data metal layer DTL2 to flatten steps. The second organic layer 161 may be made of an organic layer, such as acryl resin, epoxy resin, phenolic resin, polyamide resin, or polyimide resin.

The first contact hole CNT1 may be a hole exposing the gate electrode DTG of the driving transistor DT. The second contact hole CNT2 may be a hole exposing the second electrode D2 of the second transistor T2. The first connection electrode BE1 may be connected to the gate electrode DTG of the driving transistor DT through the first contact hole CNT1, and may be connected to the second electrode D3 of the third transistor T3 through the second contact hole CNT2.

The third contact hole CNT3 may be a hole exposing the second electrode DTD of the driving transistor DT. The fourth contact hole CNT4 may be a hole exposing the second electrode D2 of the second transistor T2. The second connection electrode BE2 may be connected to the second electrode DTD of the driving transistor DT through the third contact hole CNT3, and may be connected to the second electrode D2 of the second transistor T2 through the fourth contact hole CNT4.

The fifth contact hole CNT5 may be a hole exposing the first electrode S1 of the first transistor T1. The sixth contact hole CNT6 may be a hole penetrating the first organic layer 160 to expose the third connection electrode BE3. The third connection electrode BE3 may be connected to the first electrode S1 of the first transistor T1 through the fifth contact hole CNT5, and the $j^{th}$ data line DLj may be connected to the third connection electrode BE3 through the sixth contact hole CNT6.

The eleventh contact hole CNT11 may be a hole exposing the second electrode D5 of the fifth transistor T5. The twelfth contact hole CNT12 may be a hole penetrating the first organic layer 160 to expose the fifth connection electrode BE5. The fifth connection electrode BE5 may be connected to the second electrode D5 of the fifth transistor T5 through the eleventh contact hole CNT11, and the first anode connection electrode ANDE1 may be connected to the fifth connection electrode BE5 through the twelfth contact hole CNT12.

The first sensing contact hole LCT1 may be a hole exposing the gate electrode LG1 of the first sensing transistor LT1. The second sensing contact hole LCT2 may be a hole exposing the second electrode LD2 of the second sensing transistor LT2. The first sensing connection electrode LBE1 may be connected to the gate electrode LG1 of the first sensing transistor LT1 through the first sensing contact hole LCT1, and may be connected to the second electrode LD2 of the second sensing transistor LT2 through the second sensing contact hole LCT2.

The fifth sensing contact hole LCT5 may be a hole penetrating the first organic layer 160 to expose the first sensing connection electrode LBE1. The second anode connection electrode ANDE2 may be connected to the first sensing connection electrode LBE1 through the fifth sensing contact hole LCT5.

The light-emitting element layer is formed on the thin-film transistor layer. The light-emitting element layer includes light-emitting elements EL, light-sensing elements PD, and the bank BK. The light-emitting element layer may be located on the second organic layer 161.

Each of the light-emitting elements EL may include a pixel electrode 171, 172, 173, or 174, an organic light-emitting layer 175, and a common electrode 190. Each of the light-sensing elements PD may include a sensing electrode 180 (181 or 182), a photoelectric conversion layer 185, and the common electrode 190. The light-emitting elements EL and the light-sensing elements PD may share the common electrode 190.

The respective pixel electrodes 171 through 174 of the light-emitting elements EL and the respective sensing electrodes 180 of the light-sensing elements PD may be formed on the second organic layer 161. The pixel electrode 171, 172, 173, or 174 of each of the light-emitting elements EL may be connected to the first anode connection electrode ANDE1 through the first anode contact hole CNTA1 penetrating the first organic layer 160. The sensing electrode 180 of each of the light-sensing elements PD may be connected to the second anode connection electrode ANDE2 through the second anode contact hole CNTA2 penetrating the second organic layer 161.

The pixel electrode 171, 172, 173, or 174 of each of the light-emitting elements EL may have, but is not limited to, a single-layer structure of molybdenum (Mo), titanium (Ti), copper (Cu) or aluminum (Al) or a stacked layer structure, for example, a multilayer structure of ITO/Mg, ITO/MgF, ITO/Ag, or ITO/Ag/ITO including indium-tin-oxide (ITO), indium-zinc-oxide (IZO), zinc oxide (ZnO) or indium oxide (In$_2$O$_3$) and silver (Ag), magnesium (Mg), aluminum (Al), platinum (Pt), lead (Pb), gold (Au), or nickel (Ni).

The sensing electrode 180 of each of the light-sensing elements PD may have, but is not limited to, a single-layer structure of molybdenum (Mo), titanium (Ti), copper (Cu) or aluminum (Al) or a multilayer structure of ITO/Mg, ITO/MgF, ITO/Ag, or ITO/Ag/ITO.

The bank BK may be formed on the second organic layer 161 to define the light-emitting portions EA1 through EA4 of the pixels PX1 through PX4 and the light-sensing portions RA1 through RA4 of the photo sensors PS. The bank BK may separate the light-emitting portions EA1 through EA4 and the light-sensing portions RA1 through RA4. Each of the light-emitting portions EA1 through EA4 is an area in which the pixel electrode 171, 172, 173, or 174, the organic light-emitting layer 175, and the common electrode 190 are sequentially stacked so that holes from the pixel electrode 171, 172, 173, or 174 and electrons from the common electrode 190 are recombined in the organic light-emitting layer 175 to emit light. Each of the light-sensing portions RA1 through RA4 is an area in which the sensing electrode 180, the photoelectric conversion layer 185, and the common electrode 190 are sequentially stacked to convert light incident from the outside into an electrical signal.

The bank BK may be formed to cover edges of the pixel electrode 171, 172, 173, or 174 of each of the light-emitting elements EL and the sensing electrode 180 of each of the light-sensing elements PD. The bank BK may be made of an organic layer, such as acryl resin, epoxy resin, phenolic resin, polyamide resin, or polyimide resin.

The organic light-emitting layer 175 is formed on the pixel electrode 171, 172, 173, or 174 of each of the light-emitting elements EL. The organic light-emitting layer 175 may include an organic material to emit light of a color (e.g., predetermined color). For example, the organic light-emitting layer 175 may include a hole-transporting layer, an organic material layer, and an electron-transporting layer.

The photoelectric conversion layer 185 is formed on the sensing electrode 180 of each of the light-sensing elements PD. The photoelectric conversion layer 185 may generate photocharges in proportion to incident light. The incident light may be light entering the photoelectric conversion layer 185 after being emitted from the organic light-emitting layer 175 and then reflected, or may be light provided from the outside regardless of the organic light-emitting layer 175. Charges generated and accumulated in the photoelectric conversion layer 185 may be converted into electrical signals required for light sensing.

The photoelectric conversion layer 185 may include an electron donor material and an electron acceptor material. The electron donor material may generate donor ions in response to light, and the electron acceptor material may generate acceptor ions in response to light. When the photoelectric conversion layer 185 is made of an organic material, the electron donor material may include, but is not limited to, a compound, such as sub-phthalocyanine (SubPc) or di-butyl-phosphate (DBP). The electron acceptor material may include, but is not limited to, a compound, such as fullerene, a fullerene derivative, or perylene diimide.

The common electrode 190 may be located on the organic light-emitting layer 175, the photoelectric conversion layer 185, and the bank BK. The common electrode 190 may be formed to cover the organic light-emitting layer 175 and the photoelectric conversion layer 185. The common electrode 190 may be formed in common to the light-emitting portions EA1 through EA4 and the light-sensing portions RA1 through RA4. The common electrode 190 may include a conductive material having a low work function, such as Li, Ca, LiF/Ca, LiF/Al, Al, Mg, Ag, Pt, Pd, Ni, Au Nd, Ir, Cr, BaF, Ba, or a compound or mixture thereof (e.g., a mixture of Ag and Mg). Alternatively, the common electrode 190 may include a transparent metal oxide, such as indium-tin-oxide (ITO), indium-zinc-oxide (IZO), or zinc oxide (ZnO).

The encapsulation layer TFE may be formed on the light-emitting element layer. The encapsulation layer TFE may include at least one inorganic layer to reduce or prevent penetration of oxygen or moisture into the light-emitting element layer. In addition, the encapsulation layer TFE may include at least one organic layer to protect the light-emitting element layer from foreign substances, such as dust.

According to the currently described one or more embodiments, one first sensing driver SDU1 and one second sensing driver SDU2 may each be located for every eight pixel drivers PDU. In this case, because the area occupied by the first and second sensing drivers SDU1 and SDU2 located in the display panel 10 can be reduced, the number of the pixel drivers PDU located in the display panel 10 can be increased. Accordingly, the display panel 10 can display an image with high resolution while sensing external light.

In addition, because the first and second sensing drivers SDU1 and SDU2 are staggered in the first row and the second row, the number of the first sensing drivers SDU1 connected to the first row scan line GWL1, and the number of the second sensing drivers SDU2 connected to the second row scan line GWL2, may be equal. Accordingly, the difference between the first row scan signal of the first row scan line GWL1 and the second row scan signal of the second row scan line GWL2 can be reduced or minimized. Therefore, the display device 1 can display an image of uniform quality in the repeated first and second rows.

A display device 1 according to one or more embodiments will now be described with reference to FIGS. 17 through 21.

FIG. 17 is a conceptual diagram illustrating the arrangement relationship between pixel drivers and sensing drivers according to one or more embodiments. FIG. 18 is a layout view illustrating pixels and photo sensors of a display area of a display panel according to FIG. 17. FIGS. 19 and 20 are detailed layout views of area C of FIG. 18. FIG. 21 is an example of a cross-sectional view taken along the line D-D' of FIGS. 19 and 20.

In the display device 1 according to the currently described one or more embodiments, each first area AA1 may include a first dummy circuit unit DDU1, and each second area AA2 may include a second dummy circuit unit DDU2. The first dummy circuit units DDU1 and the second dummy circuit units DDU2 may include circuit patterns, like first sensing drivers SDU1 or second sensing drivers SDU2, but may include patterns from which a semiconductor layer is omitted. In another example, the first dummy circuit units DDU1 and the second dummy circuit units DDU2 may include circuit patterns, like the first sensing drivers SDU1 or the second sensing drivers SDU2, but may include patterns not connected by a contact hole. In the currently described one or more embodiments, the patterns in which the semiconductor layer is omitted as the first dummy circuit units DDU1 and the second dummy circuit units DDU2 are provided as an example, although the present disclosure is not limited thereto.

Referring to FIG. 17, the display device 1 includes the first dummy circuit units DDU1 located between first row pixel drivers RPDU1, and located alternately with the first sensing drivers SDU1 in the first direction DR1, and includes the second dummy circuit units DDU2 located between second row pixel drivers RPDU2, and located alternately with the second sensing drivers SDU2 in the first direction DR1.

The first sensing drivers SDU1 and the second dummy circuit units DDU2 may be alternately located in the second direction DR2, and the second sensing drivers SDU2 and the first dummy circuit units DDU1 may be alternately located in the second direction DR2.

The first dummy circuit units DDU1 may overlap first row scan lines GWL1, but may not be connected to the first row scan lines GWL1. The second dummy circuit units DDU2 may overlap second row scan lines GWL2, but may not be connected to the second row scan lines GWL2.

Referring to FIG. 18, each first light-emitting portion EA1 may overlap a first pixel driver PDU1 and a fourth pixel driver PDU4, and each third light-emitting portion EA3 may overlap a second pixel driver PDU2 and a third pixel driver PDU3. Each second light-emitting portion EA2 and each fourth light-emitting portion EA4 may each overlap the first through fourth pixel drivers PDU1 through PDU4, any one of the (e.g., a corresponding one of) first and second sensing drivers SDU1 and SDU2, and any one of (e.g., a corresponding one of) the first and second dummy circuit units DDU1 and DDU2.

Each first photo sensor PS1 includes a plurality of light-sensing portions RA1 through RA4, a first sensing driver SDU1, a second dummy circuit unit DDU2, and a first sensing electrode 181. Each second photo sensor PS2 includes a plurality of light-sensing portions RA1 through RA4, a second sensing driver SDU2, a first dummy circuit unit DDU1, and a second sensing electrode 182.

Among the light-sensing portions RA1 through RA4, a first light-sensing portion RA1 may overlap a second sensing driver SDU1 or a second sensing driver SDU2. A second light-sensing portion RA2 may overlap a first dummy circuit unit DDU1 or a second dummy circuit unit DDU2. Each of a third light-sensing portion RA3 and a fourth light-sensing portion RA4 may overlap at least two pixel drivers.

The arrangement relationship of each first dummy circuit unit DDU1 will be described in detail with reference to FIGS. 19 and 20. FIG. 19 is a layout view illustrating a first active layer, a first gate layer, a second gate layer, a second active layer, a third gate layer, and a first data layer of a third pixel driver PDU3 and a first dummy circuit unit DDU1. FIG. 20 is a layout view further illustrating a second data layer and a light-emitting element layer.

The first dummy circuit unit DDU1 may include first through fourth dummy electrodes FE1 through FE4. The first dummy circuit unit DDU1 may overlap a first row reset control line RSTL1, a first row emission control line EML1, a first row scan line GWL1, a first row scan control line GCL1, and a first row scan initialization line GIL1 located in a first row and extending in the first direction DR1. The first dummy circuit unit DDU1 may overlap a second reset voltage line VRL2 extending in the second direction DR2 and a first column readout line ROL1 located in a first column.

The first dummy electrode FE1 may be substantially the same as the gate electrode LG1 of the first sensing transistor LT1 located in the second sensing driver SDU2 of FIG. 12. The first dummy electrode FE1 may be located in a first gate metal layer GTL1. However, the first dummy electrode FE1 is different from the gate electrode LG1 in that the first dummy electrode FE1 is not connected to any electrode, and is an electrically floating electrode.

The second dummy electrode FE2 may be substantially the same as the first sensing connection electrode LBE1 located in the second sensing driver SDU2 of FIG. 12. The second dummy electrode FE2 may be located in a first data metal layer DTL1. However, the second dummy electrode FE2 is different from the first sensing connection electrode LBE1 in that the second dummy electrode FE2 is not connected to any electrode and is an electrically floating electrode.

The third dummy electrode FE3 may be substantially the same as the second sensing connection electrode LBE2 located in the second sensing driver SDU2 of FIG. 12. The third dummy electrode FE3 may be located in the first data metal layer DTL1. However, the third dummy electrode FE3 is different from the second sensing connection electrode LBE2 in that the third dummy electrode FE3 is not connected to any electrode and is an electrically floating electrode.

The fourth dummy electrode FE4 may be substantially the same as the second anode connection electrode ANDE2 located in the second sensing driver SDU2 of FIG. 13. The fourth dummy electrode FE4 may be located in a second data metal layer DTL2. However, the fourth dummy electrode FE4 is different from the second anode connection electrode ANDE2 in that the fourth dummy electrode FE4 is not connected to any electrode and is an electrically floating electrode.

A second light-sensing portion RA2 of an organic light-emitting layer may overlap the first dummy electrode FE1, the second dummy electrode FE2, and the fourth dummy electrode FE4 in the thickness direction of a substrate SUB.

A second dummy circuit unit DDU2 is substantially the same as the first dummy circuit unit DDU1 except that it is connected to signal lines (e.g., a second row scan line GWL2) located in a second row, and thus will not be described again here.

Referring to FIG. 21, the first active layer may not be located between a buffer layer BF and a first gate-insulating layer 131 in the first dummy circuit unit DDU1. The second active layer may not be located between a second interlayer-insulating layer 142 and a second gate-insulating layer 132 in the first dummy circuit unit DDU1.

The first dummy electrode FE1 may be located in the first gate metal layer GTL1. The first dummy electrode FE1 may be covered with a first interlayer-insulating layer 141. The second dummy electrode FE2 and the third dummy electrode FE3 may be located in the first data metal layer DTL1. The second dummy electrode FE2 and the third dummy electrode FE3 may be covered with a first organic layer 160. The fourth dummy electrode FE4 may be located in the second data metal layer DTL2. The fourth dummy electrode FE4 may be covered with a second organic layer 161. In a manufacturing process, the first dummy electrode FE1 may be formed at the same time as the gate electrode LG1 (see FIG. 12) of the first sensing transistor LT1 (see FIG. 12), the second dummy electrode FE2 and the third dummy electrode FE3 may be formed at the same time as the first sensing connection electrode LBE1 (see FIG. 12) and the second sensing connection electrode LBE2 (see FIG. 12), and the fourth dummy electrode FE4 may be formed at the same time as the second anode connection electrode ANDE2 (see FIG. 12).

According to the currently described one or more embodiments, the first and second dummy circuit units DDU1 and DDU2 may be included to uniformly maintain widths of the first and second row scan lines GWL1 and GWL2. Because each of the first and second dummy circuit units DDU1 and DDU2 includes the first through fourth dummy electrodes FE1 through FE4, it may have a density per unit area close to those of the first and second sensing drivers SDU1 and SDU2. That is, an empty space may be reduced or minimized to uniformly maintain the widths of the lines in the first row or the second row.

In one or more embodiments, the first through fourth dummy electrodes FE1 through FE4 may be connected to voltage lines for applying a direct current (DC) voltage to stably maintain voltages of the first through fourth dummy electrodes FE1 through FE4. For example, each of the first through fourth dummy electrodes FE1 through FE4 may be connected to any one of a first reset voltage line VRL1, the second reset voltage line VRL2, a first initialization voltage line VIL1, a second initialization voltage line VIL2, and a driving voltage line VDL.

FIG. 22 is a conceptual diagram illustrating the arrangement relationship between pixel drivers and sensing drivers according to one or more embodiments.

In FIG. 22, as in FIG. 8, two first row pixel drivers RPDU1 and two second row pixel drivers RPDU2 are illustrated. First sensing drivers SDU1 and first areas AA1 located between the first row pixel drivers RPDU1, and second sensing drivers SDU2 and second areas AA2 located between the second row pixel drivers RPDU2, are illustrated.

In a display device according to the currently described one or more embodiments, a sensing electrode 180 may connect a plurality of light-sensing portions RA1 through RA4 to one sensing driver. For example, a first sensing electrode 181 may connect a plurality of light-sensing portions RA1 through RA4 to a first sensing driver SDU1, and a second sensing electrode 182 may connect a plurality of light-sensing portions RA1 through RA4 to a second sensing driver SDU2. The first sensing electrode 181 may connect four light-sensing portions RA1 through RA4 including a first light-sensing portion RA1 located in a second area AA2, and the second sensing electrode 182 may connect four light-sensing portions RA1 through RA4 including a second light-sensing portion RA2 located in a first area AA1.

The currently described one or more embodiments may be different from the previously described embodiments in that the sensing electrodes 181 and 182 connecting the light-sensing portions RA1 through RA4 are located in a zigzag pattern on one side and the other side of the sensing drivers SDU1 and SDU2 in the first direction DR1.

For example, the first sensing electrode 181 may be respectively alternately located on left and right sides of an even-numbered first sensing driver SDU1 and an odd-numbered first sensing driver SDU1, and the second sensing electrode 182 may be respectively alternately located on left and right sides of an even-numbered second sensing driver SDU2 and an odd-numbered second sensing driver SDU2.

First, when 2n (where n is a natural number) first sensing drivers SDU1 are arranged along the second direction DR2, a $(2n-1)^{th}$ first sensing driver SDU1 may be connected to the first sensing electrode 181 located on one side in the first direction DR1, and a $(2n)^{th}$ first sensing driver SDU1 may be connected to the first sensing electrode 181 located on the other side in the first direction DR1. For example, a first sensing driver SDU1 located in a first row in the drawing may be connected to the light-sensing portions RA1 through RA4 and to the first sensing electrode 181 that is located on a right side of the first sensing driver SDU1. Further, a first sensing driver SDU1 located in a third row may be connected to the light-sensing portions RA1 through RA4 and to the first sensing electrode 181 that is located on a left side of the first sensing driver SDU1.

Similarly, when 2n second sensing drivers SDU2 are arranged along the second direction DR2, a $(2n-1)^{th}$ second sensing driver SDU2 may be connected to the second sensing electrode 182 located on one side in the first direction DR1, and a $(2n)^{th}$ second sensing driver SDU2 may be connected to the second sensing electrode 182 located on the other side in the first direction DR1. For example, a first second sensing driver SDU2 located in a second row in the drawing may be connected to the light-sensing portions RA1 through RA4 and to the second sensing electrode 182 that is located on a right side of the second sensing driver SDU2. Further, a second sensing driver SDU2 located in a fourth row may be connected to the light-sensing portions RA1 through RA4 and to the second sensing electrode 182 that is located on a left side of the second sensing driver SDU2.

It should be understood, however, that the aspects and features of embodiments of the present disclosure are not restricted to the one set forth herein. The above and other aspects of the present disclosure will become more apparent to one of ordinary skill in the art to which the present disclosure pertains by referencing the claims, with functional equivalents thereof to be included therein.

What is claimed is:

1. A display device comprising:
light-emitting elements for emitting light;
light-sensing elements for converting light into an electrical signal, and spaced apart from the light-emitting elements;
pixel drivers respectively connected to the light-emitting elements in a first row and a second row;
a first sensing driver between respective ones of the pixel drivers in the first row, and connected to a first one of the light-sensing elements;
a second sensing driver between respective ones of the pixel drivers in the second row, connected to a second one of the light-sensing elements, and not neighboring the first sensing driver in a second direction;
a first scan line extending along a first direction crossing the second direction, and connected to the first sensing driver;
a second scan line extending along the first direction, alternately arranged with the first scan line along the second direction, and connected to the second sensing driver;
a first dummy circuit comprising a first dummy electrode; and
a second dummy circuit comprising an other first dummy electrode,
wherein at least eight of the pixel drivers are between the first sensing driver and the other first sensing driver neighboring each other in the first direction, the at least eight of the pixel drivers being arranged in the first direction,
wherein at least one of the first sensing driver or the second sensing driver comprises a first sensing transistor having a gate electrode, and wherein the first dummy electrode and the other first dummy electrode are electrically floating, and are at a same layer as the gate electrode of the first sensing transistor.

2. The display device of claim 1, wherein the first sensing driver is staggered with the second sensing driver along the second direction.

3. The display device of claim 1, wherein the first sensing driver is provided in plurality to be repeatedly arranged at intervals along the first row in the first direction, and wherein the second sensing driver is provided in plurality to be repeatedly arranged at intervals along the second row in the first direction.

4. The display device of claim 1, wherein each of the pixel drivers is connected to the first scan line or the second scan line.

5. The display device of claim 1, wherein at least four of the pixel drivers are sequentially arranged along the first direction.

6. The display device of claim 1, further comprising: a first column readout line connected to the second sensing driver, and extending in the second direction; and a second column readout line connected to the first sensing driver, extending in the second direction, and being alternately arranged with the first column readout line along the first direction.

7. The display device of claim 6, wherein the first sensing driver comprises:

the first sensing transistor, the first sensing transistor being configured to control a sensing current that flows to the second column readout line according to a voltage of the gate electrode; and a second sensing transistor connected to the second column readout line and to the first sensing transistor by the first scan line.

8. The display device of claim 1, wherein the first dummy circuit is alternately arranged with the first sensing driver along the first direction, and wherein the second dummy circuit is alternately arranged with the second sensing driver along the first direction, and alternately arranged with the first sensing driver along the second direction.

9. The display device of claim 8, wherein the first sensing transistor is configured to control for controlling a sensing current that flows to a readout line according to a voltage of the gate electrode.

10. A display device comprising:

first row pixel drivers in first rows;

second row pixel drivers in second rows;

first sensing drivers and first areas alternately arranged in a first direction in the first rows, the first sensing drivers comprising a first sensing transistor comprising a gate electrode and configured to control a sensing current that flows to a readout line according to a voltage of the gate electrode;

second sensing drivers and second areas in the second rows, the second areas being alternately arranged with the first sensing drivers in a second direction crossing the first direction; and first dummy circuits alternately arranged with the first sensing drivers along the first direction, and comprising a first dummy electrode at a same layer as the gate electrode of the first sensing transistor, wherein at least one first row pixel driver among the first row pixel drivers is between one of the first sensing drivers and one of the first areas neighboring each other in the first direction, and wherein at least one second row pixel driver among the second row pixel drivers is between one of the second sensing drivers and one of the second areas neighboring each other in the first direction.

11. The display device of claim 10, wherein the second sensing drivers and the second areas are alternately arranged in the first direction, and wherein the second sensing drivers and the first areas are alternately arranged in the second direction.

12. The display device of claim 10, wherein the first sensing drivers and the first areas respectively overlap first row scan lines extending in the first direction, and wherein the second sensing drivers and the second areas respectively overlap second row scan lines that extend in the first direction, and that are alternately arranged with the first row scan lines in the second direction.

13. A display device comprising:

light-emitting portions for emitting light;

pixel drivers for supplying a driving current to the light-emitting portions;

light-sensing portions comprising photodiodes for sensing incident light, and spaced apart from the light-emitting portions;

a first sensing driver between respective ones of the pixel drivers in a first direction, and electrically connected to some of the light-sensing portions; and a first sensing electrode connected to the first sensing driver for each group of the light-sensing portions, and comprising a connection portion directly connecting anodes of the photodiodes of the light-sensing portions, overlapping at least two pixel drivers among the pixel drivers, and between the light-emitting portions in plan view.

14. The display device of claim 13, wherein the first sensing driver is for supplying a sensing current to any one readout line among readout lines according to photocurrents of the light-sensing portions.

15. The display device of claim 13, further comprising:

a second sensing driver between neighboring ones of the pixel drivers neighboring each other in the first direction, electrically connected to light-sensing portions, and not neighboring the first sensing driver in a second direction crossing the first direction; and a second sensing electrode connected to the second sensing driver for each group of the light-sensing portions.

\* \* \* \* \*